(12) United States Patent
Nagai et al.

(10) Patent No.: US 7,683,784 B2
(45) Date of Patent: Mar. 23, 2010

(54) APPARATUS FOR COMMUNICATION WITH A RADIO-FREQUENCY TAG, RADIO-FREQUENCY TAG, RADIO-FREQUENCY COMMUNICATION SYSTEM, AND RADIO-FREQUENCY COMMUNICATION METHOD

(75) Inventors: Takuya Nagai, Nagoya (JP); Shiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 385 days.

(21) Appl. No.: 11/691,806

(22) Filed: Mar. 27, 2007

(65) Prior Publication Data
US 2007/0200685 A1 Aug. 30, 2007

Related U.S. Application Data

(63) Continuation-in-part of application No. PCT/JP2005/016903, filed on Sep. 14, 2005.

(30) Foreign Application Priority Data

Sep. 30, 2004 (JP) ............................. 2004-286194

(51) Int. Cl.
*G08B 13/14* (2006.01)
(52) U.S. Cl. .............. 340/572.1; 340/572.4; 340/572.7; 340/5.9; 340/10.34; 340/10.51; 235/380; 235/385; 235/492; 700/95; 700/225
(58) Field of Classification Search .............. 340/572.1, 340/572.4, 572.7, 5.9, 10.34, 10.51; 235/380, 235/385, 492; 700/95, 225
See application file for complete search history.

(56) References Cited

U.S. PATENT DOCUMENTS 7,103,433 B1 * 9/2006 Yuan et al. .................... 700/95
7,253,717 B2 * 8/2007 Armstrong et al. ......... 340/10.2

FOREIGN PATENT DOCUMENTS

| JP | 2001-022905 A | 1/2001 |
| JP | 2001-024547 A | 1/2001 |
| JP | 2001-092885 A | 4/2001 |

OTHER PUBLICATIONS

Japanese Patent Office, Office Action for priority Patent Appl'n. No. JP 2006-537669, mailed Sep. 9, 2008. (counterpart of above-captioned Patent Application.).
International Bureau, International Search Report for Related International Application No. PCT/JP2005/016903, mailed Dec. 6, 2005.

* cited by examiner

*Primary Examiner*—Tai T Nguyen
(74) *Attorney, Agent, or Firm*—Baker Botts L.L.P.

(57) ABSTRACT

A radio-frequency communication system including a plurality of apparatus for communication with a radio-frequency tag, and at least one radio-frequency relay tag, wherein each of the apparatus for communication with a radio-frequency tag includes a transmitter portion configured to transmit to the relay tag a message writing command for writing on the relay tag a desired message to be transmitted to another apparatus for communication with a radio-frequency tag via the relay tag, and each relay tag includes a plurality of message storage portions provided to store the messages transmitted from the respective apparatus for communication with a radio-frequency tag.

28 Claims, 17 Drawing Sheets

APPARATUS FOR COMMUNICATION WITH A RADIO-FREQUENCY TAG, RADIO-FREQUENCY TAG, RADIO-FREQUENCY COMMUNICATION SYSTEM, AND RADIO-FREQUENCY COMMUNICATION METHOD

The present application is a Continuation-in-Part of International Application No. PCT/JP2005/016903 filed on Sep. 14, 2005, which claims the benefit of Japanese Patent Application No. 2004-286194 filed on Sep. 30, 2004, the disclosure of which is hereby incorporated by reference in its entirety.

BACKGROUND OF THE INVENTION

1. Field of the Invention

The present invention relates to an apparatus for communication with a radio-frequency tag configured to write and read information on and from a radio-frequency tag, for effecting radio communication with the radio-frequency tag, and also relates to the radio-frequency tag, a radio-frequency communication system including the apparatus for communication with a radio-frequency tag and the radio-frequency tag, and a method for radio communication between the apparatus for communication with a radio-frequency tag and the radio-frequency tag.

2. Description of the Related Art

In various fields of communication, there is available a radio-frequency communication device configured to transmit a transmitted signal toward a desired communication object, and to receive a reply signal transmitted from the communication object in response to the transmitted signal received from the radio-frequency communication device, so that radio communication is effected between the radio-frequency communication device and the communication object. As one form of such a radio-frequency communication device, there is known an apparatus for communication with a radio-frequency tag (interrogator) configured to effect radio communication with small-sized radio-frequency tags (transponders) which store predetermined information. The radio-frequency tags and the apparatus for communication with a radio-frequency tag constitute a so-called radio frequency identification system (RFID system) wherein objects to which the radio-frequency tags are affixed can be identified by writing and reading information on and from the desired radio-frequency tags in a non-contact fashion using an electric wave. The radio-frequency communication device of this RFID system is capable of reading out the information from the radio-frequency tags, by radio communication with the radio-frequency tags, even where the radio-frequency tags are soiled or located at invisible places. For this reason, the RFID system is expected to be used in various fields such as management and inspection of commodities.

As one example of the above-described radio-frequency communication system, there is proposed a radio-frequency communication system including a plurality of apparatus for communication with a radio-frequency tag capable of effecting radio communication with desired radio-frequency tags. JP-2001-92885A discloses a behavior data processing system as an example of such a radio-frequency tag communication system. In this behavior data processing system, a plurality of apparatus for communication with a radio-frequency tag connected to each other by a suitable network are configured to effect communication with radio-frequency tags which move with respective moving objects, for processing in a real-time fashion behavior data indicative of behaviors of the moving objects within a building or compound.

However, the prior art radio-frequency communication system requires a network such as a cable network for mutual information communication among the plurality of apparatus for communication with a radio-frequency tag, and tends to be complicated in system construction. The plurality of apparatus for communication with a radio-frequency tag may be arranged to effect mutual radio communication through a wireless network. In this case, a method for mutual radio communication among the apparatus for communication with a radio-frequency tag is different from a method for radio communication of the apparatus for communication with a radio-frequency tag with the radio-frequency tags, so that the radio-frequency communication system requires different communication arrangements. Thus, there has been a need of developing a technique which permits highly reliable communication among a plurality of apparatus for communication with a radio-frequency tag, with a simple arrangement of each apparatus for communication with a radio-frequency tag.

SUMMARY OF THE INVENTION

The present invention was made in view of the background art described above. Accordingly, it is an object of the present invention to provide a technique which permits highly reliable radio communication among a plurality of apparatus for communication with a radio-frequency tag, with a simple arrangement of each apparatus for communication with a radio-frequency tag.

The object indicated above can be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only.

(1) An apparatus for communication with a radio-frequency tag configured to transmit a transmitted signal and to receive a reply signal transmitted from a radio-frequency tag in response to said transmitted signal, for effecting radio communication with said radio-frequency tag, the apparatus for communication with a radio-frequency tag comprising a transmitter portion configured to transmit to the radio-frequency tag a message writing command for writing on the radio-frequency tag a desired message to be transmitted to another apparatus for communication with a radio-frequency tag via the radio-frequency tag.

In the apparatus for communication with a radio-frequency tag constructed according to the above-described mode (1) of this invention, the desired message to be transmitted to another apparatus for communication with a radio-frequency tag is written on the radio-frequency tag functioning as a relay tag, so that the message can be transmitted from the radio-frequency tag to another apparatus for communication with a radio-frequency tag (receiver) which is comparatively distant from the apparatus for communication with a radio-frequency tag in question (transmitter). Thus, the present mode of the invention provides a technique which permits highly reliable radio communication among a plurality of apparatus for communication with a radio-frequency tag, with an arrangement of each apparatus for communication with a radio-frequency tag which is similar to that for ordinary communication with the radio-frequency tags.

(2) The apparatus for communication with a radio-frequency tag according to the above-described mode (1), wherein the desired message includes an identification code of the above-indicated another apparatus for communication with a radio-frequency tag which is a receiver of the desired message. In this mode of the invention, the receiver of the message is identified by the identification code included in the message.

(3) The apparatus for communication with a radio-frequency tag according to the above-described mode (1) or (2), wherein the desired message includes an identification code of the apparatus for communication with a radio-frequency tag which is a transmitter of the desired message. In this mode of the invention, the apparatus for communication with a radio-frequency tag which is the receiver of the message can recognize the apparatus for communication with a radio-frequency tag which is the transmitter of the message.

(4) The apparatus for communication with a radio-frequency tag according to any one of the above-described modes (1)-(3), wherein the transmitter portion is configured to transmit to the radio-frequency tag a first message erasing command asking the radio-frequency tag to erase a message which has been transmitted from another apparatus for communication with a radio-frequency tag via the radio-frequency tag to the apparatus for communication with a radio-frequency tag which is a receiver of the message an identification code of which is written on the radio-frequency tag. In this mode of the invention, the receiver of the message can erase the message which is stored in the radio-frequency tag and which has been transmitted to the receiver, so that a message storage portion of the radio-frequency tag can be used for storing new messages.

(5) The apparatus for communication with a radio-frequency tag according to the above-described mode (3) or (4), wherein the transmitter portion is configured to transmit to the radio-frequency tag a second message erasing command asking the radio-frequency tag to erase the desired message which has been transmitted to the radio-frequency tag from the apparatus for communication with a radio-frequency tag which is the transmitter then identification code of which is written on the radio-frequency tag. In this mode of the invention, the transmitter of the desired message can command the radio-frequency tag to erase the message stored in the radio-frequency tag, after the message has been transmitted to another apparatus for communication with a radio-frequency tag (receiver), or if the transmitter does not now intend to transmit the message to the receiver. Accordingly, the message storage portion of the radio-frequency tag can be used for storing new messages.

(6) An apparatus for communication with a radio-frequency tag according to any one of the above-described modes (1)-(5), wherein the transmitter portion is configured to transmit to the radio-frequency tag a replying command for writing on the radio-frequency tag a reply message acknowledging normal reception of a message by the apparatus for communication with a radio-frequency tag from the above-indicated another apparatus for communication with a radio-frequency tag via the radio-frequency tag. In this mode of the invention, the receiver of the message can inform the transmitter of the message that the message has been normally received by the receiver.

(7) The apparatus for communication with a radio-frequency tag according to any one of the above-described modes (1)-(6), wherein the transmitter portion is configured to transmit to the radio-frequency tag a message reading command for reading a message which has been transmitted to the radio-frequency tag from the above-indicated another apparatus for communication with a radio-frequency tag, and a message writing command for writing the desired message on the radio-frequency tag. In this mode of the invention, the apparatus for communication with a radio-frequency tag in question can read the message written on the radio-frequency tag, and write the desired message on the radio-frequency tag.

(8) The apparatus for communication with a radio-frequency tag according to any one of the above-descried modes (1)-(7), wherein the transmitter portion is configured to transmit to surrounding radio-frequency tags a message checking command asking the radio-frequency tag to reply to the message checking command if any of the surrounding radio-frequency tags stores a message including an identification code of the apparatus for communication with a radio-frequency tag, as an address of a receiver of the message stored therein. In this mode of the invention, the receiver of the message can easily find any of the surrounding radio-frequency tags which stores the message to be addressed to the receiver, by transmitting the message checking command to the surrounding radio-frequency tags.

(9) The apparatus for communication with a radio-frequency tag according to the above-described mode (8), wherein the transmitter portion repeatedly transmits the message checking command to the surrounding radio-frequency tags at a predetermined time interval. In this mode of the invention, the receiver of the message can find, without a delay, any of the surrounding radio-frequency tags which stores the message to be addressed to the receiver, by repeatedly transmitting the message checking command at the predetermined time interval.

(10) The apparatus for communication with a radio-frequency tag according to any one of the above-described modes (1)-(9), further comprising a path-information storage portion for storing path information indicative of a path to the above-indicated another apparatus for communication with a radio-frequency tag. In this mode of the invention, radio communication between the radio-frequency tag in question and another apparatus for communication with a radio-frequency tag not communicable with the relay tag with which the apparatus for communication with a radio-frequency tag in question is communicable, can be effected through the above-indicated radio-frequency tag, at least one other radio-frequency tag and at least one other apparatus for communication with a radio-frequency tag.

(11) A radio-frequency tag with which an apparatus for communication with a radio-frequency tag as defined in any one of the above-described modes (1)-(10) effects radio communication, said radio-frequency tag comprising a plurality of message storage portions each of which is provided to store the desired message.

The radio-frequency tag constructed according to the above-described mode (11) and comprising the plurality of message storage portions can function as a relay tag through which radio communication among a plurality apparatus for communication with a radio-frequency tag can be effected. Since the plurality of message storage portions can store respective messages transmitted from the respective apparatus for communication with a radio-frequency tag, the radio-frequency tag can efficiently function as the relay tag through which each message can be transmitted from one of the apparatus for communication with a radio-frequency tag to another. Thus, the present mode of the invention provides a technique which permits highly reliable radio communication among the plurality of apparatus for communication with a radio-frequency tag, with a simple arrangement of each apparatus for communication with a radio-frequency tag.

(12) The radio-frequency tag according to the above-described mode (11), wherein each of the plurality of message storage portions includes a transmitter identification code storage section for storing an identification code of the apparatus for communication with a radio-frequency tag which is a transmitter of the desired message. In this mode of the invention, the transmitter of the message stored in each message storage portion can be identified by the identification code stored in the transmitter identification code storage section of the message storage portion.

(13) The radio-frequency rag according to the above-described mode (11) or (12), wherein each of the plurality of message storage portions includes a receiver identification code storage section for storing an identification code of the apparatus for communication with a radio-frequency tag which is a receiver of the desired message. Accordingly, the receiver of the message stored in each message storage portion can be identified by the identification code stored in the receiver identification code storage section of the message storage portion.

(14) The radio-frequency tag according to the above-described mode (13), which is configured to be operable, in response to a first message erasing command received from the apparatus for communication with a radio-frequency tag, to erase the message stored in the message storage portion the receiver identification code storage section of which stores the identification code of the receiver of the message, which identification code is identical with an identification code of the apparatus for communication with a radio-frequency tag from which the first message erasing command has been received. In this mode of the invention, the receiver of the message can command the radio-frequency tag to erase the message stored in the message storage portion, after the message has been received by the receiver.

(15) The radio-frequency tag according to any one of the above-described modes (12)-(14), which is configured to be operable, in response to a second message erasing command received from the apparatus for communication with a radio-frequency tag, to erase the message stored in the message storage portion the transmitter identification code storage section of which stores the identification code of the transmitter of the message, which identification code is identical with an identification code of the apparatus for communication with a radio-frequency tag from which the second message erasing command has been received. In this mode of the invention, the transmitter of the message can command the radio-frequency tag to erase the message stored in the message storage portion, after the message has been transmitted from the transmitter to the receiver via the radio-frequency tag, or the transmitter does not now intend to transmit the message to the receiver.

(16) The radio-frequency tag according to any one of the above-described modes (11)-(15), further comprising a relay-station identification code storage portion for storing an identification code of the radio-frequency tag functioning as a relay station for transmission of the message among a plurality of apparatus for communication with a radio-frequency tag. In this mode of the invention, the relay tag can be distinguished from the other or non-relay radio-frequency tags.

(17) The radio-frequency tag according to any one of the above-described modes (13)-(16), which is configured such that when the radio-frequency tag has received a message checking command from the apparatus for communication with a radio-frequency tag, and if an identification code of the apparatus for communication with a radio-frequency tag from which the message checking command has been received is identical with the identification code stored in said receiver identification code storage section, the radio-frequency tag transmits to said apparatus for communication with a radio-frequency tag said message including the identification code of said receiver. In this mode of the invention, the message address to the receiver of the message can be transmitted to the receiver.

(18) The radio-frequency tag according to any one of the above-described modes (13)-(17), which is configured such that when the radio-frequency tag has received a message checking command from the apparatus for communication with a radio-frequency tag, and if an identification code of the apparatus for communication with a radio-frequency tag from which the message checking command has been received is identical with the identification code stored in the receiver identification code storage section, the radio-frequency tag transmits the identification code of the receiver to the above-indicated apparatus for communication with a radio-frequency tag. In this mode of the invention, it is possible to notify the receiver of the message that the message addressed to the receiver is stored in the radio-frequency tag.

(19) The radio-frequency tag according to any one of the above-described modes (11)-(18), further comprising an adjacent-station identification code storage portion for storing identification codes of a plurality of adjacent apparatus for communication with a radio-frequency tag which are adjacent to the radio-frequency tag. In this mode of the invention, the apparatus for communication with a radio-frequency tag communicable with the radio-frequency tag can know the identification codes of the other apparatus for communication with a radio-frequency tag communicable with the radio-frequency tag.

(20) The radio-frequency tag according to any one of the above-described modes (11)-(19), further comprising a path-information storage portion for storing path information indicative of a path to a desired apparatus for communication with a radio-frequency tag. In this mode of the invention, radio communication between the apparatus for communication with a radio-frequency tag in question and desired another apparatus for communication with a radio-frequency tag can be effected through at least the radio-frequency tag in question.

(21) The radio-frequency tag according to any one of the above-described modes (11)-(20), wherein the message storage portion is constituted by a non-volatile memory formed of a ferroelectric material. In this mode of the invention, the message can be written and read on and from the message storage portion, with the same amount of consumption of an electric energy, and the maximum distance between the radio-frequency tag and the apparatus for communication with a radio-frequency tag can be increased.

(22) The radio-frequency tag according to any one of the above-described modes (11)-(21), which is an active tag comprising a power source device which supplies an electric energy for operation of the active tag. In this mode of the invention, the radio-frequency tag can transmit a message to the apparatus for communication with a radio-frequency tag which is comparatively distant from the radio-frequency tag, namely, the maximum distance between the radio-frequency tag and the apparatus for communication with a radio-frequency tag can be increased.

(23) A radio-frequency communication system including a plurality of apparatus for communication with a radio-frequency tag each configured as according to any one of the above-described modes (1)-(10), and at least one radio-frequency tag each configured according to any one of the above-described modes (11)-(22), the radio-frequency communication system being characterized in that a message is transmitted from one of the plurality of apparatus for communication with a radio-frequency tag to another of the plurality of apparatus for communication with a radio-frequency tag via one of the at least one radio-frequency tag, which functions as a relay tag.

In the radio-frequency communication system constructed according to the above-described mode (23) of the present invention, the transmission of the message from one of the plurality of apparatus for communication with a radio-frequency tag to another of the plurality of apparatus for communication with a radio-frequency tag is effected via one of the at least one radio-frequency tag, which functions as a relay tag. In this mode of the invention, the message can be transmitted among the plurality of apparatus for communication with a radio-frequency tag, without using a special communication protocol or a special device for communication among the apparatus for communication with a radio-frequency tag. Thus, the present mode of the invention provides a technique which permits highly reliable radio communication among the plurality of apparatus for communication with a radio-frequency tag, with an arrangement of each apparatus for communication with a radio-frequency tag which is similar to that for ordinary communication with the radio-frequency tags.

(24) The radio-frequency communication system according to the above-described mode (23), which includes a plurality of radio-frequency tags, and wherein the relay tag stores management information on the other of the plurality of radio-frequency tags, and one of the plurality of apparatus for communication with a radio-frequency tag reads out the management information from the relay tag. In this mode of the invention, articles of commodity to which the above-indicated other radio-frequency tags are affixed can be inspected without radio communication with all of the above-indicated other radio-frequency tags (non-relay tags).

(25) The radio-frequency communication system according to the above-described mode (24), wherein the management information includes number information indicative of the number of the other of the plurality of radio-frequency tags. In this mode of the invention, the number of the articles to which the above-indicated other radio-frequency tags are affixed can be recognized, without radio communication with all of the above-indicated other radio-frequency tags (non-relay tag).

(26) A method of effecting radio communication by a radio-frequency communication system including a plurality of apparatus for communication with a radio-frequency tag each configured according to any one of the above-described modes (1)-(10), and at least one radio-frequency tag each configured according to any one of the above-described modes (11)-(22), the method being characterized in that a message is transmitted from one of the plurality of apparatus for communication with a radio-frequency tag to another of the plurality of apparatus for communication with a radio-frequency tag via one of the at least one radio-frequency tag, which functions as a relay tag.

In the method according to the above-described mode (26), the transmission of the message from one of the plurality of apparatus for communication with a radio-frequency tag to another of the plurality of apparatus for communication with a radio-frequency tag is effected via one of the at least one radio-frequency tag, which functions as a relay tag. In this mode of the invention, the message can be transmitted among the plurality of apparatus for communication with a radio-frequency tag, without using a special communication protocol or a special device for communication among the apparatus for communication with a radio-frequency tag. Thus, the present mode of the invention provides a technique which permits highly reliable radio communication among the plurality of apparatus for communication with a radio-frequency tag, with an arrangement of each apparatus for communication with a radio-frequency tag which is similar to that for ordinary communication with the radio-frequency tags.

(27) The method according to the above-described mode (26), wherein the radio-frequency communication system includes a plurality of radio-frequency tags, and wherein the relay tag stores management information on the other of the plurality of radio-frequency tags, and one of the plurality of apparatus for communication with a radio-frequency tag reads out the management information from the relay tag. In this mode of the invention, articles of commodity to which the above-indicated other radio-frequency tags are affixed can be inspected without radio communication with all of the above-indicated other radio-frequency tags (non-relay tags).

(28) The method according to the above-described mode (27), wherein the management information includes number information indicative of the number of the other of the plurality of radio-frequency tags. In this mode of the invention, the number of the articles to which the above-indicated other radio-frequency tags are affixed can be recognized, without radio communication with all of the above-indicated other radio-frequency tags (non-relay tag).

BRIEF DESCRIPTION OF THE DRAWING

The above and other objects, features and industrial significance of this invention will be better understood by reading the following detailed description of preferred embodiments of the invention, when considered in connection with the accompanying drawings in which.

DETAILED DESCRIPTION OF THE PREFERRED EMBODIMENTS

The preferred embodiments of this invention will be described in detail by reference to the accompanying drawings.

Embodiment 1

Figure 1:
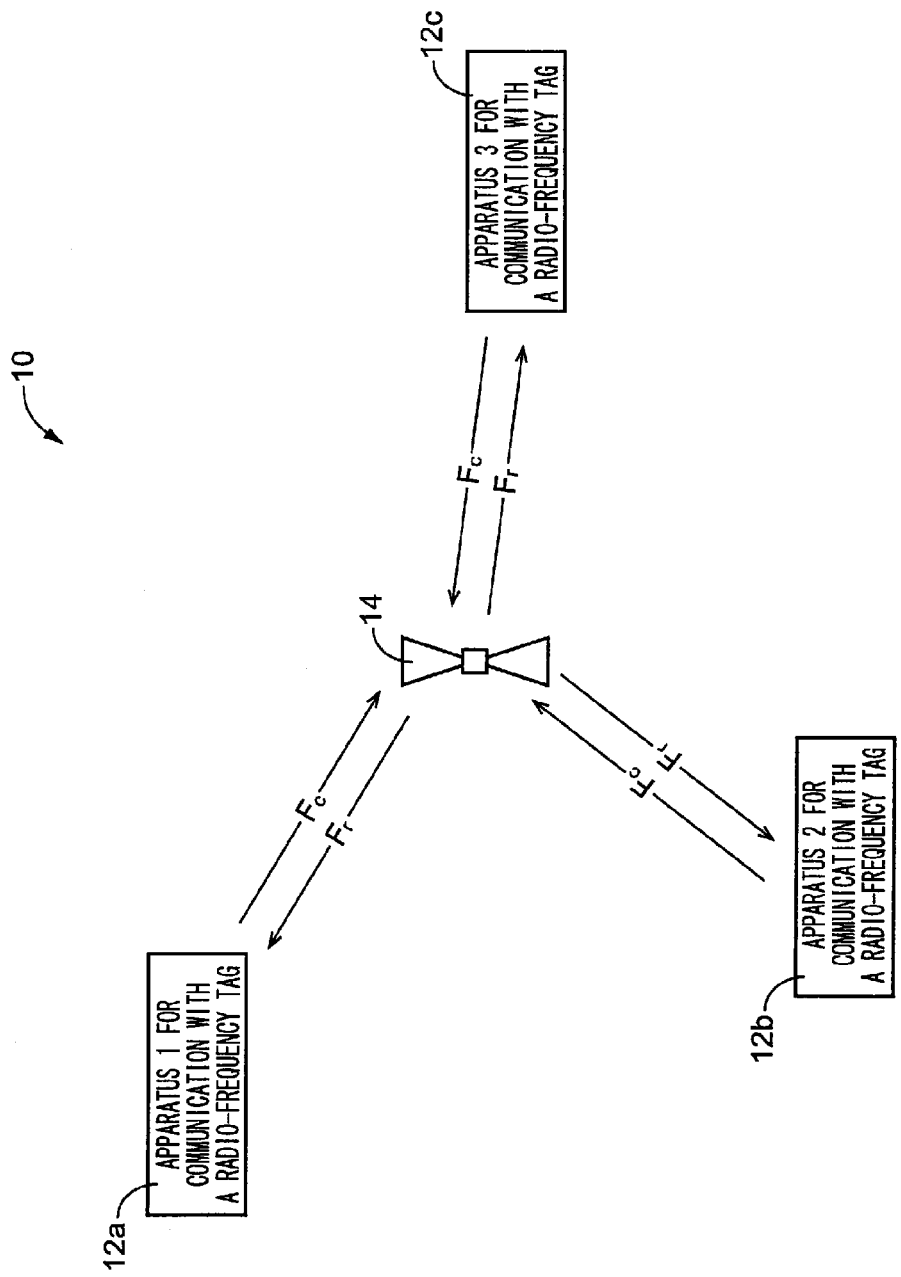
FIG. 1 is a view showing a radio-frequency communication system constructed according to a first embodiment of the present invention.

Referring to FIG. 1, there is shown an arrangement of a radio-frequency communication system 10 constructed according to a first embodiment of this invention. This radio-frequency communication system 10 is a so-called RFID (radio-frequency identification) system which consists of a plurality of apparatus for communication with a radio-frequency tag (three radio-frequency communication devices 12a, 12b, 12c in the example of FIG. 1, which are hereinafter collectively referred to as "radio-frequency communication devices 12", unless otherwise specified), and at least one radio-frequency tag 14 (one radio-frequency tag in the example of FIG. 1). The apparatus 12 for communication with a radio-frequency tag function as interrogators of the RFID system 10, while the radio-frequency tag 14 functions as a transponder of the RFID system 10. Described in detail, each apparatus for communication with a radio-frequency tag 12 is arranged to transmit an interrogating wave Fc (transmitted signal) toward the radio-frequency tag 14, and the radio-frequency tag 14 which has received the interrogating wave Fc modulates the received interrogating wave Fc according to a desired information signal (data), and transmits the modulated wave as a reply wave Fr (reply signal) toward the apparatus 12 for communication with a radio-frequency tag. Thus, radio communication is effected between the apparatus 12 for communication with a radio-frequency tag and the radio-frequency tag 14. In the present radio-frequency communication system 10, each apparatus 12 for communication with a radio-frequency tag is configured to be able to transmit a message to any other apparatus 12 for communication with a radio-frequency tag through the radio-frequency tag 14 functioning as a relay tag.

Figure 2:
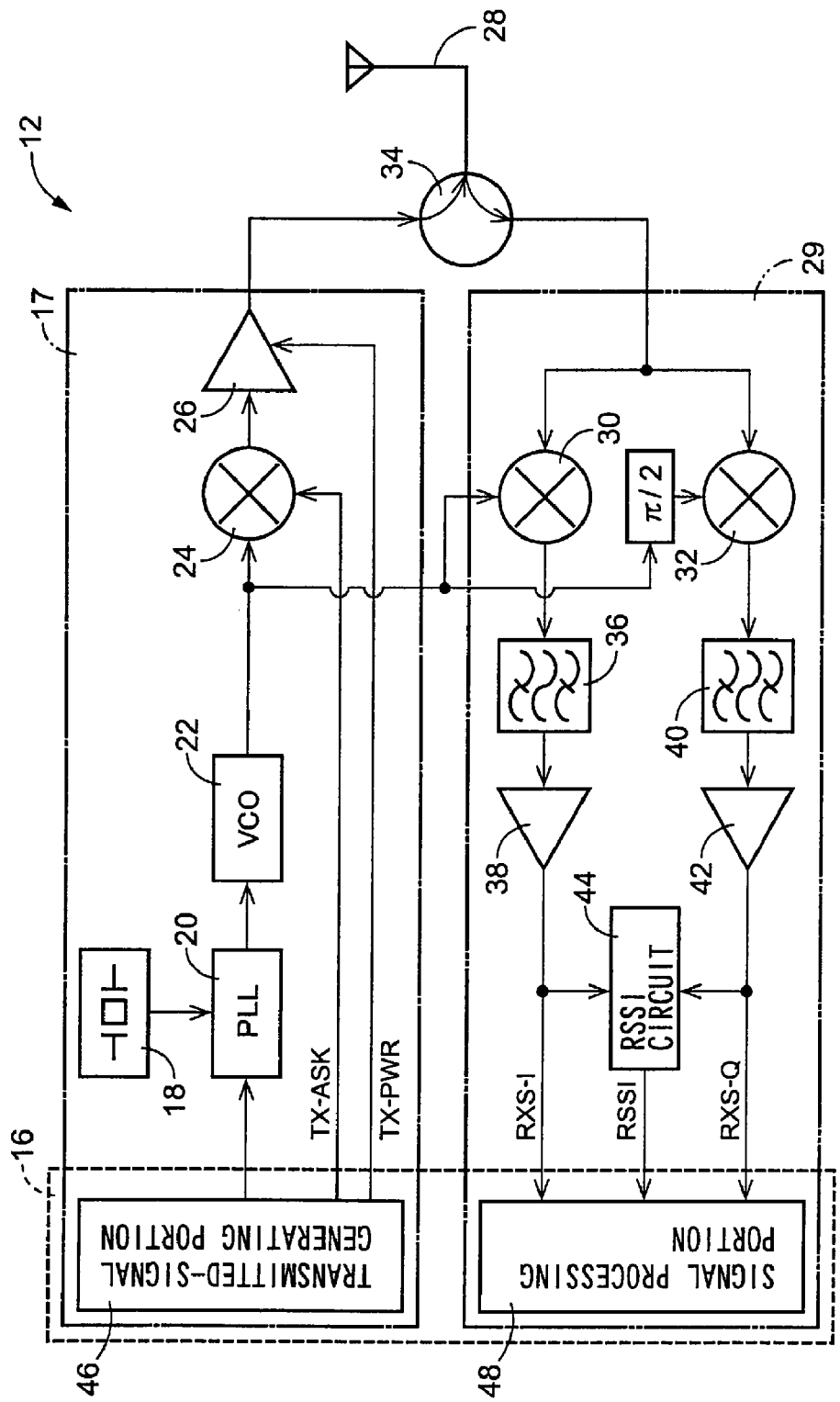
FIG. 2 is a block diagram showing an arrangement of each apparatus for communication with a radio-frequency tag included in the radio-frequency communication system of FIG. 1.

Referring next to the block diagram of FIG. 2, there is shown an arrangement of each apparatus 12 for communication with a radio-frequency tag. The apparatus 12 for communication with a radio-frequency tag is arranged to effect radio communication with the radio-frequency tag 14, for writing and reading information on and from the radio-frequency tag 14, or for radio communication with any other apparatus 12 for communication with a radio-frequency tag through the radio-frequency tag 14 functioning as the relay tag. As shown in FIG. 2, the apparatus 12 for communication with a radio-frequency tag includes: a DSP (digital signal processor) 16 configured to generate the digital transmitted signal, and to perform digital signal processing operations such as an operation to demodulate the reply signal received from the radio-frequency tag 14; a reference-frequency generating portion 18 configured to generate a reference wave; a PLL (phase locked loop) 20 configured to set the frequency of a main carrier wave of the interrogating wave Fc, on the basis of the reference wave generated by the reference-frequency generating portion 18 and a control signal received from the DPS16; a VCO (voltage controlled oscillator) 22 configured to control the frequency of the main carrier wave according to a control voltage received from the PLL 20; a main-carrier modulating portion 24 configured to generate the transmitted signal by amplitude modulation of the main carrier wave (the frequency of which has been controlled by the VCO 22) on the basis of a control signal TX-ASK; a transmitted-signal amplifying portion 26 configured to amplify the transmitted signal received from the main-carrier modulating portion 24, on the basis of a control signal TX-PWR; a transmitter/receiver antenna device 28 arranged to transmit, as the interrogating wave Fc, the transmitted signal amplified by the transmitted-signal amplifying portion 26, toward a communication object in the form of the radio-frequency tag 14, and to receive the reply wave Fr transmitted from the radio-frequency tag 14 in response to the interrogating wave Fc; an I-phase-signal converting portion 30 and a Q-phase-signal converting portion 32, which are respectively configured to convert the received signal received by the antenna device 28, into an mutually perpendicular I-phase and Q-phase signals, respectively; a transmission/reception switching portion 34 configured to selectively apply the transmitted signal generated from the transmitted-signal amplifying portion 26, to the antenna device 28, or apply the received signal received by the antenna device 28 to the I-phase-signal and Q-phase-signal converting portions 30, 32; an I-phase-signal BPF (band pass filter) 36 configured to extract only a predetermined frequency band of the I-phase signal received from the I-phase-signal converting portion 30, an I-phase-signal amplifying portion 38 configured to amplify the I-phase signal received from the I-phase-signal BPF 36; a Q-phase-signal BPF (band pass filter) 40 configured to extract only a predetermined frequency band of the Q-phase signal received from the Q-phase-signal converting portion 32; a Q-phase-signal amplifying portion 42 configured to amplify the Q-phase signal received from the Q-phase-signal BPF 40; and an RSSI (received-signal-strength indicator) circuit 44 configured to detect the strength values of the I-phase and Q-phase signals amplified by the respective I-phase-signal and Q-phase-signal amplifying portions 38, 42. Preferably, a circulator or a directional coupler is used as the transmission/reception switching portion 34.

The DSP 16 described above is a so-called "microcomputer" which incorporates a CPU, a ROM and a RAM and which is configured to process signal processing operations according to a control program stored in the ROM, while utilizing a temporary data storage function of the RAM. The DSP 16 has functional portions including a transmitted-signal generating portion 46 configured to generate the transmitted signal to be transmitted toward the communication object in the form of the radio-frequency tag 14, and a signal processing portion 48 configured to process the received signal which is transmitted from the radio-frequency tag 14 in response to the transmitted signal and which is received by the antenna device 28. It will be understood that the reference-frequency generating portion 18, PLL 20, VCO 22, main-carrier modulating portion 24, transmitted-signal amplifying portion 26 and transmitted-signal generating portion 46, which contribute to transmission of the transmitted signal toward the radio-frequency tag 14, cooperate to constitute a transmitter portion 17, while the I-phase-signal converting portion 30, Q-phase-signal converting portion 32, I-phase-signal BPF 36, I-phase-signal amplifying portion 38, Q-phase-signal BPF 40, Q-phase-signal amplifying portion 42, RSSI circuit 44 and signal processing portion 48, which contribute reception of the reply signal from the radio-frequency tag 14, cooperate to constitute a receiver portion 29.

Figure 3:
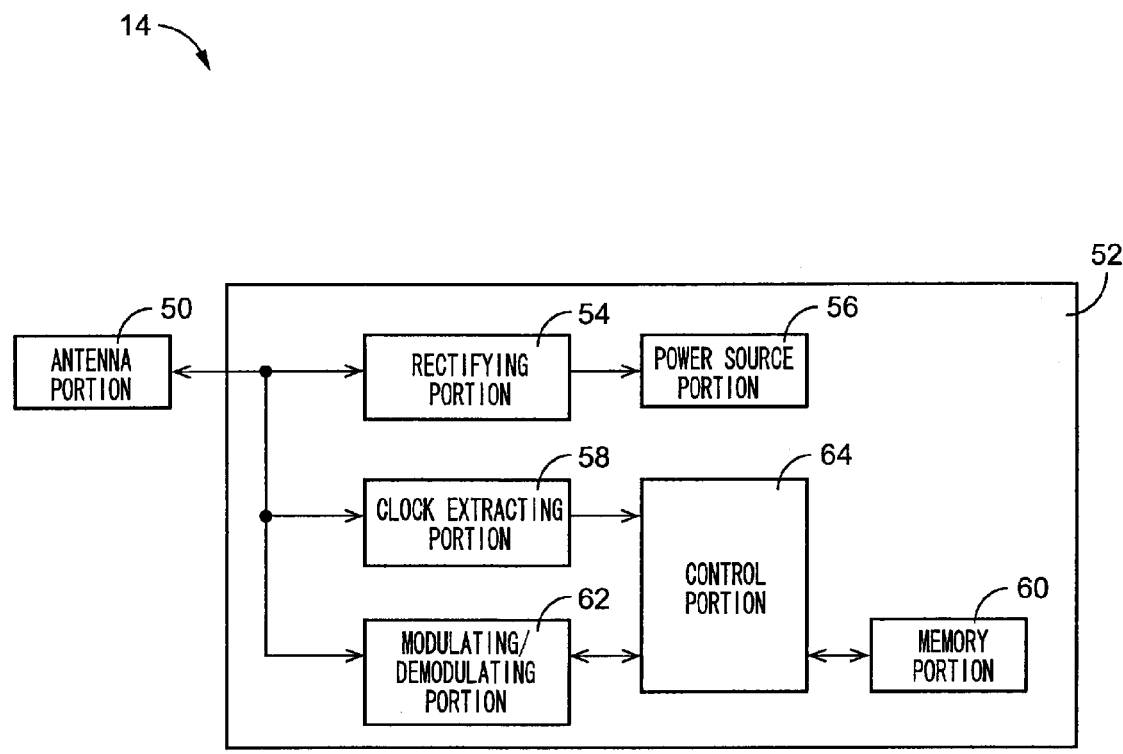
FIG. 3 is a block diagram showing an arrangement of a radio-frequency tag included in the radio-frequency communication system of FIG. 1.

Referring further to the block diagram of FIG. 3, there is shown an arrangement of the radio-frequency tag 14. As shown in FIG. 3, the radio-frequency tag 14 includes an antenna portion 50 for signal transmission and reception to and from the apparatus 12 for communication with a radio-frequency tag, and an IC-circuit portion 52 configured to process the signal received by the antenna portion 50. The IC-circuit portion 52 has functional portions including: a rectifying portion 54 configured to rectify the interrogating wave Fc by the antenna portion 50; a power source portion 56 configured to store an electric energy of the interrogating wave Fc rectified by the rectifying portion 54, and to supply various portions of the IC-circuit portion 52 with the electric energy; a clock extracting portion 58 configured to extract a clock signal from the carrier wave of the interrogating wave Fc received by the antenna portion 50, and to apply the extracted clock signal to a control portion 64; a memory portion 60 functioning as an information storage portion configured to store desired information; a modulating/demodulating portion 62 connected to the antenna portion 50 and configured to effect modulation and demodulation of signals; and the above-indicated control portion 64 configured to control the radio-frequency tag 14 through the rectifying portion 54, clock extracting portion 58 and modulating/demodulating portion 62. The control portion 64 is arranged to implement basing control operations such as: an operation to store the desired information in the memory portion 60 through radio communication with the apparatus 12 for communication with a radio-frequency tag; an operation to command the modulating/demodulating portion 62 to modulate the interrogating wave Fc received by the antenna portion 50, on the basis of the information signal stored in the memory portion 60, for generating the reply wave Fr to be transmitted from the antenna portion 50 toward the apparatus 12 for communication with a radio-frequency tag; and an operation to enable the radio-frequency tag 14 to function as a relay tag used for radio communication among the plurality of apparatus 12 for communication with a radio-frequency tag.

Figure 4:
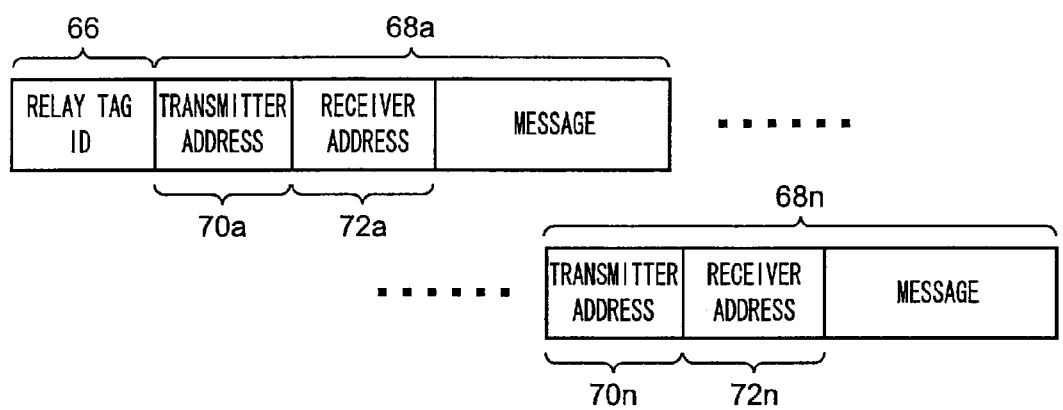
FIG. 4 is a view showing an arrangement of storage portions of a memory portion of the radio-frequency tag of FIG. 3, which are provided to enable the radio-frequency tag to function as a relay tag.

FIG. 4 shows an arrangement of storage portions of the memory portion 60 of the radio-frequency tag 14, which are provided to enable the radio-frequency tag 14 to function as the relay tag. The memory portion 60 is preferably constituted by a non-volatile memory formed of a ferroelectric material, such as FRAM (ferroelectric random access memory) which is a registered trademark of RAMTRON INTERNATIONAL. As shown in FIG. 4, the memory portion 60 includes a relay-station identification code storage portion 66 for storing an identification code of a relay station in the form of the relay tag for transmission of a message among the plurality of apparatus 12 for communication with a radio-frequency tag, and a plurality of message storage portions 68a, 68b, 68c, . . . , 68n-1 and 68n (hereinafter collectively referred to as "message storage portions 68", unless otherwise specified) for storing messages to be transmitted among the plurality of apparatus 12 for communication with a radio-frequency tag. The message storage portions 68a, 68b 68c, . . . , 68n-1 and 68n respectively include: transmitter identification code storage sections 70a, 70b, 70c, . . . 70n-1 and 70n (hereinafter collectively referred to as "transmitter identification code storage sections 70", unless otherwise specified) for storing transmitter addresses in the form of the identification codes of the apparatus 12 for communication with a radio-frequency tag which are the transmitters of the messages; and receiver identification code storage sections 72a, 672b, 72c, . . . 72n-1 and 72n (hereinafter collectively referred to as "receiver identification code storage sections 72", unless otherwise specified) for storing receiver addresses in the form of the identification codes of the apparatus 12 for communication with a radio-frequency tag which are the receivers of the messages. Thus, each message storage portion 68 storing a message includes the transmitter identification code storage section 70 storing the transmitter address, and the receiver identification code storage section 72 storing the receiver address. Namely, the memory portion 60 of the radio-frequency tag 14 functioning as the relay tag is able to store the messages to be transmitted among the plurality of apparatus 12 for communication with a radio-frequency tag.

Figure 5:
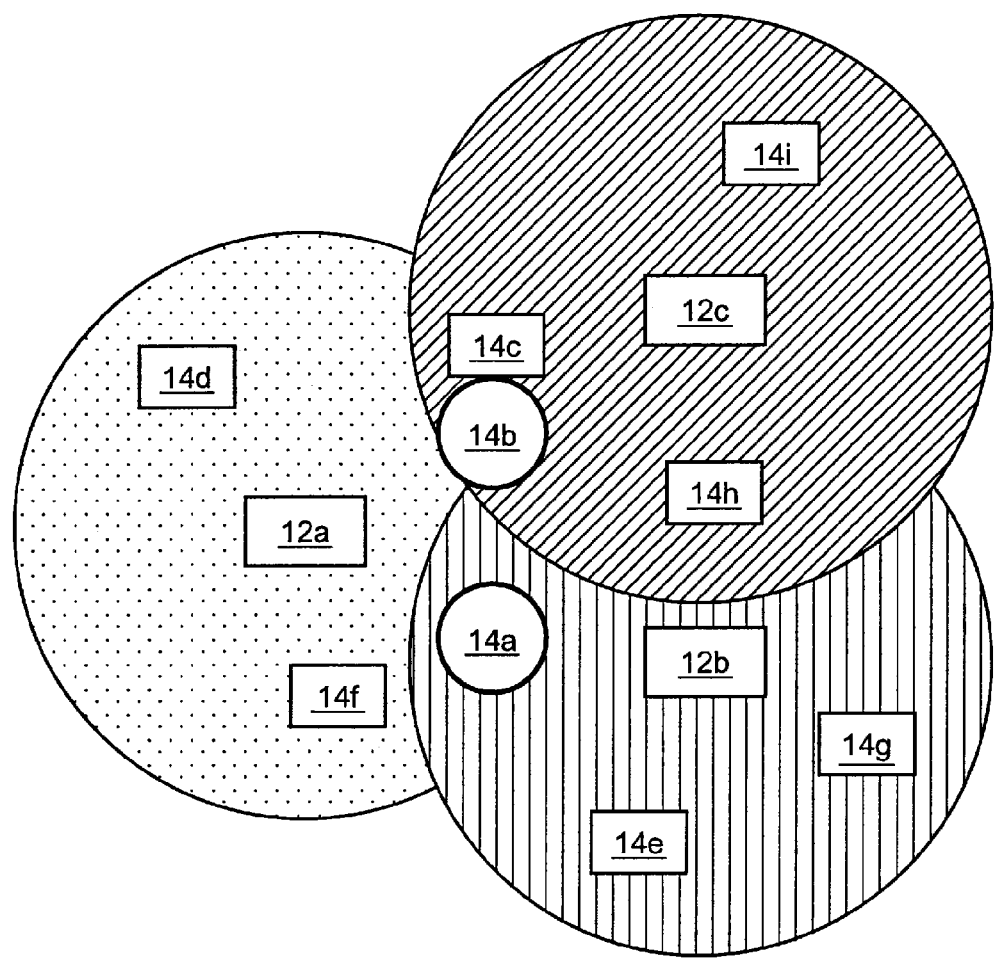
FIG. 5 is a view for explaining radio communication among the apparatus for communication with a radio-frequency tag, which is effected by using the radio-frequency tag of FIG. 3 as the relay tag.

Referring to FIG. 5, there will be explained the radio communication among the apparatus 12 for communication with a radio-frequency tag, which is effected by using the radio-frequency tag 14 3 as the relay tag (relay station). In the radio communication system of the example of FIG. 5, the two radio-frequency tags 14a and 14b are used as relay tags for radio communication among the three apparatus 12a, 12b and 12c for communication with a radio-frequency tag. The radio communication system further include the radio-frequency tags 14c-14i which are RFID communication radio-frequency tags not functioning as relay tags.

The transmitted-signal generating portion 46 of the DSP 16 of each apparatus 12 for communication with a radio-frequency tag is configured to generate a suitable transmitted signal to be transmitted toward the radio-frequency tag 14 functioning as the relay tag, for writing a desired message on the radio-frequency tag, so that the desired message is transmitted to another apparatus 12 for communication with a radio-frequency tag via the relay tag. That is, the apparatus 12 for communication with a radio-frequency tag in question transmits a suitable message writing command to the radio-frequency tag 14 functioning as the relay tag, for writing the desired message on the relay tag. The message to be written in the memory portion 60 of the radio-frequency tag 14 according to the message writing command is accompanied by the transmitter address in the form of the identification code of the apparatus 12 for communication with a radio-frequency tag in question, and the receiver address in the form of the identification code of the apparatus 12 for communication with a radio-frequency tag to which the desired message is to be transmitted. According to the message writing command, the desired message is stored in the message storage portion 68, and the transmitter address and the receiver address are stored in the transmitter identification code storage section 70 and the receiver identification code storage section 72, respectively. In the specific example of FIG. 5, the radio-frequency tag 14a functions as the relay tag for radio communication between the two apparatus 12a and 12b for communication with a radio-frequency tag, while the radio-frequency tag 14b functions as the relay tag for radio communication between the two apparatus 12a and 12c for communication with a radio-frequency tag. Usual RFID communication between each of the apparatus 12a-12c for communication with a radio-frequency tag and each of the radio-frequency tags 14c-14i is effected according to an ordinary RFID communication protocol.

The transmitted-signal generating portion 46 is further arranged to transmit a suitable message reading command to the radio-frequency tag 14 functioning as the relay tag, for reading the messages stored in the relay tag 14. For example, the transmitted-signal generating portion 46 of the apparatus 12 for communication with a radio-frequency tag in question is configured to transmit a message checking command toward the surrounding or neighboring radio-frequency tags 14, asking these radio-frequency tags 14 to reply to the message checking command if any of these radio-frequency tags 14 stores the identification code of the apparatus 12 for communication with a radio-frequency tag in question, as the address of the receiver of the message stored in the radio-frequency tag 14 in question functioning as the relay tag. For instance, the transmitted-signal generating portion 46 is arranged to repeatedly transmit the message checking command toward the surrounding radio-frequency tags 14, at a predetermined time interval. Upon reception of the message checking command by the radio-frequency tag 14a or 14b functioning as the relay tag, this relay tag 14a, 14b determines whether the identification code of the apparatus 12 for communication with a radio-frequency tag from which the message checking command has been received is identical with the identification code stored as the receiver address stored in the receiver identification code storage section 72. If an affirmative determination is made by the relay tag 14a, 14b, the relay tag 14a, 14b transmits the message corresponding to the receiver address to the apparatus 12 for communication with a radio-frequency tag in question, or informs this apparatus 12 for communication with a radio-frequency tag that the relay tag 14a, 14b stores the message to be addressed to the apparatus 12 for communication with a radio-frequency tag in question. In the latter case, the relay tag 14a, 14b transmits the message in question to the apparatus 12 for communication with a radio-frequency tag in question, upon reception of the message reading command from the apparatus 12 for communication with a radio-frequency tag in question. Thus, a desired message can be transmitted from one of the plurality of apparatus 12 for communication with a radio-frequency tag to another apparatus 12 for communication with a radio-frequency tag via the relevant relay tag 14a, 14b.

The transmitted-signal generating portion 46 is further arranged to generate a first message erasing command and transmit the first message erasing command to the relay tag 14a, 14b, asking the relay tag 14a, 14b to erase the message which has been transmitted from another apparatus 12 for communication with a radio-frequency tag via the relay tag 14a, 14b to the apparatus 12 for communication with a radio-frequency tag in question which is the receiver of the message the identification code (address) of which is stored in the relay tag 14a, 14b. Upon reception of the first message erasing command by the radio-frequency tag 14a, 14b functioning as the relay tag, this relay tag 14a, 14b determines whether the identification code of the apparatus 12 for communication with a radio-frequency tag in question from which the first message erasing command has been received is identical with the identification code stored as the receiver address in the receiver identification code storage section 72. If an affirmative determination is made, the relay tag 14a, 14b erases the message to be addressed to the apparatus 12 for communication with a radio-frequency tag in question. Thus, the apparatus 12 for communication with a radio-frequency tag which has received the message from the relay tag 14a, 14b can erase the message stored in the relay tag 14a, 14b.

The transmitted-signal generating portion 46 is further arranged to generate a second message erasing command and transmit the second message erasing command to the relay tag 14a, 14b, asking the relay tag 14a, 14b to erase the message which has been transmitted to the relay tag 14a, 14b from the apparatus 12 for communication with a radio-frequency tag in question which is the transmitter of the message the identification of which is stored in the relay tag 14a, 14b. Upon reception of the second message erasing command by the radio-frequency tag 14a, 14b functioning as the relay tag, this relay tag 14a, 14b determines whether the identification code of the apparatus 12 for communication with a radio-frequency tag in question from which the second message erasing command has been received is identical with the identification code stored as the transmitter address in the transmitter identification code storage section 70. If an affirmative determination is made, the relay tag 14a, 14b erases the message to be addressed to another apparatus 12 for communication with a radio-frequency tag (receiver). Thus, the apparatus 12 for communication with a radio-frequency tag in question (transmitter) can command the relay tag 14a, 14b to erase the message stored in the relay tag 14a, 14b, after the message has been transmitted to transmitted to another apparatus 12 for communication with a radio-frequency tag (receiver),or if the transmitter does not now intend to transmit the message to the receiver.

The transmitted-signal generating portion 46 is further arranged to generate a replying command and transmit the replying command to the relay tag 14a, 14b after normal reception of the message from the relay tag 14a, 14b, for writing on the relay tag 14a, 14b a desired reply to the apparatus 12 for communication with a radio-frequency tag which is the transmitter the identification code (address) of which is stored in the transmitter identification code storage section 70. Namely, the replying command is transmitted to the relay tag 14a, 14b to write a reply message (acknowledging the normal reception of the original message) on the relay tag 14a, 14b, so that the reply message is transmitted from the relay tag 14a, 14b to the apparatus 12 for communication with a radio-frequency tag which is the transmitter of the original message. Thus, the apparatus 12 for communication with a radio-frequency tag which has normally received the original message from the transmitter can transmit the reply message to the transmitter.

Referring next to the flow chart of FIG. 6, there will be described an RFID communication control routine executed by the DSP 16 of each apparatus 12 for communication with a radio-frequency tag (hereinafter referred to as "apparatus 12 for communication with a radio-frequency tag in question"), to effect radio communication with the radio-frequency tag 14. This control routine is repeated executed with a predetermined cycle time.

Figure 6:
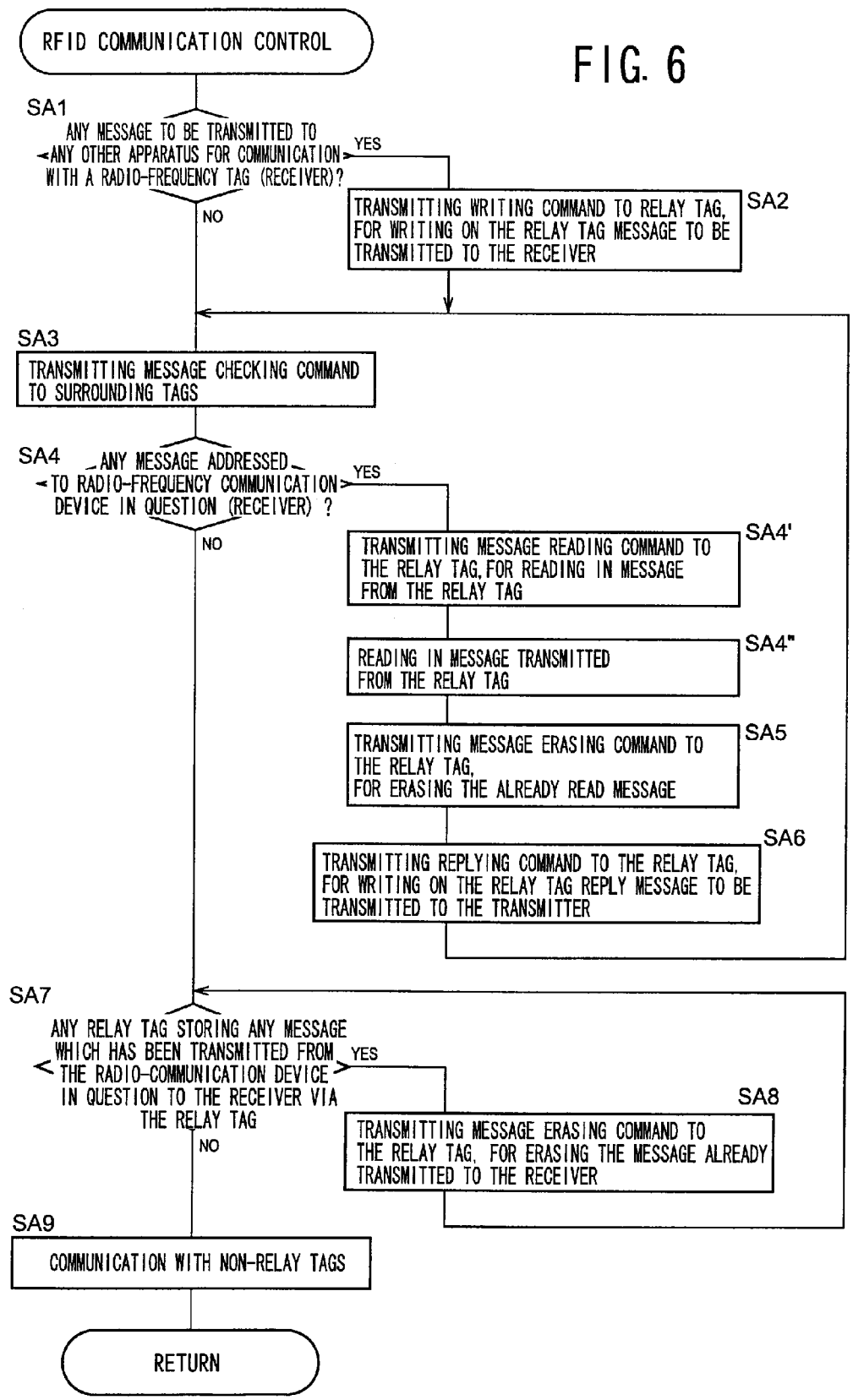
FIG. 6 is a flow chart illustrating an RFID communication control routine executed by a DSP of the apparatus for communication with a radio-frequency tag of FIG. 2, to effect radio communication with the radio-frequency tag of FIG. 3.

The RFID communication control routine of FIG. 6 is initiated with step SA1 to determine whether there is any message to be transmitted to any other apparatus 12 for communication with a radio-frequency tag (receiver). If an affirmative determination is obtained in step SA1, the control flow goes to step SA2 to transmit the message writing command to the relay tag 14, for writing on the relay tag 14 the desired message to be transmitted to the other apparatus 12 for communication with a radio-frequency tag which is the receiver of the desired message. Then, the control flow goes to step SA3 and the following steps. If a negative determination is obtained in step SA1, the control flow goes to the step SA3 to transmit the message checking command toward the surrounding or neighboring radio-frequency tags 14, asking these radio-frequency tags 14 to reply to the message checking command if any of these radio-frequency tags 14 stores the identification code of the apparatus 12 for communication with a radio-frequency tag in question, as the address of the receiver of the message stored in the radio-frequency tag 14 in question functioning as the relay tag. Then, the control flow goes to step SA4 to determine whether the apparatus 12 for communication with a radio-frequency tag in question has received a reply from any relay tag 14 informing that any message is addressed to the apparatus 12 for communication with a radio-frequency tag in question (receiver). If a negative determination is obtained in step SA4, the control flow goes to step SA7 and the following steps. If an affirmative determination is obtained in step SA4, the control flow goes to step SA4' to transmit to the relay tag 14 the message reading command to the relay tag 14 in question, and then to step SA4" to read in the message transmitted from the relay tag 14. Then, the control flow goes to step SA5 to transmit to the relay tag 14 the first message erasing command for erasing the message which has already been received by the apparatus 12 for communication with a radio-frequency tag in question. The control flow then goes to step SA6 to transmit to the relay tag 14 the replying command, for writing on the relay tag 14 the desired reply message to be transmitted to the apparatus for communication with a radio-frequency tag 14 (transmitter) from which the original message has been received by the apparatus 12 for communication with a radio-frequency tag in question (receiver). The reply message informs the former apparatus 12 for communication with a radio-frequency tag (transmitter) that the original message has been normally received by the latter apparatus 12 for communication with a radio-frequency tag (receiver). Step SA6 is followed by step SA3 to determine whether there is any other message stored in the relay tag 14. If a negative determination is obtained in step SA4, the control flow goes to step SA7 to determine whether there is any relay tag 14 which stores a message which has already been transmitted from the radio-frequency tag 12 in question (transmitter) to any other apparatus 12 for communication with a radio-frequency tag (receiver) via the relay tag 14. For the determination in step SA7, the transmitted-signal generating portion 46 is configured to transmit an inquiry command to the relay tag 14, for asking the relay tag 14 to determine whether the relay tag 14 has received, from the receiver of the original message, a replying message informing that the receiver of the message has already received the original message from the apparatus 12 for communication with a radio-frequency tag in question (transmitter) via the relay tag 14. If the replying message from the receiver is received by the apparatus 12 for communication with a radio-frequency tag in question (transmitter), an affirmative determination is obtained in step SA7, the control flow goes to step SA8 to transmit to the relay tag 14 a second message erasing command for erasing the message already transmitted to the receiver. Then, the control flow goes back to step SA7 to determine whether there is any other message which has been transmitted from the apparatus 12 for communication with a radio-frequency tag in question (transmitter) to the receiver via the relay tag 14. If a negative determination is obtained in step SA7, the control flow goes to step SA9 in which ordinary RFID communication with a desired one of the non-relay tags 14c-14i is effected. The present control routine of FIG. 6 is terminated with the termination of step SA9. It will be understood that a portion of the DSP 16 assigned to implement steps SA2, SA3, SA5, SA6 and SA8 constitutes the transmitted-signal generating portion 46.

Referring to the flow chart of FIG. 7, there will be described an operation of the radio-frequency tag 14a, 14b as the relay tag, under the control of the control portion 64. This relay tag control routine is executed when the relay tag 14a, 14b has received any one of predetermined signals through its antenna portion 50 from the apparatus 12 for communication with a radio-frequency tag (transmitter).

Figure 7:
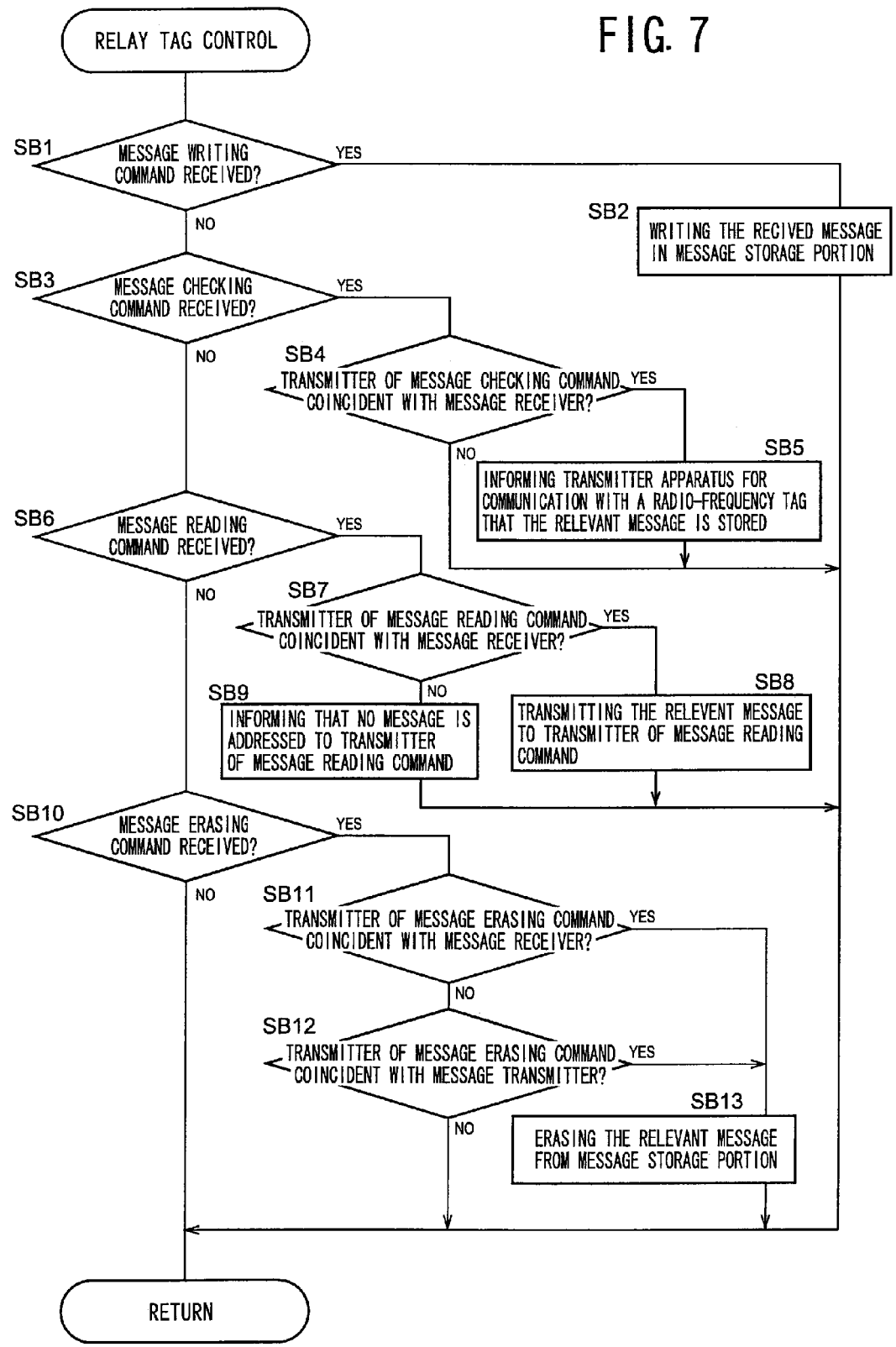
FIG. 7 is a flow chart illustrating an operation of the radio-frequency tag of FIG. 3 as the relay tag, under the control of a control portion of the radio-frequency tag.

The relay tag control routine of FIG. 7 is initiated with step SB1 to determine whether the signal received from the apparatus 12 for communication with a radio-frequency tag is the message writing command. If an affirmative determination is obtained in step SB1, the control flow goes to step SB2 to write the message received from the apparatus 12 for communication with a radio-frequency tag together with the message writing command, in the message storage portion 68 of the memory portion 60, and the present relay tag control routine is terminated. If a negative determination is obtained in step SB1, the control flow goes to step SB3 to determine whether the received signal is the message checking command. If an affirmative determination is obtained in step SB3, the control flow goes to step SB4 to determine whether the identification code of the apparatus 12 for communication with a radio-frequency tag from which the message checking command has been received is identical with the identification code stored as the receiver address in the receiver identification code storage section 72. If a negative determination is obtained in step SB4, the present relay tag control routine is terminated. If an affirmative determination is obtained in step SB4, the control flow goes to step SB5 to transmit. to the apparatus 12 for communication with a radio-frequency tag the identification code of which is stored in the receiver identification code storage section 72, the identification code of the relay tag 14 and a message that the message addressed to the apparatus 12 for communication with a radio-frequency tag from which the message checking command has been received is stored in the relay tag. The present relay tag control routine is terminated with the termination of step SB5. If a negative determination is obtained in step SB3, the control flow goes to sep SB6 to determine whether the received signal is the message reading command. If an affirmative determination is obtained in step SB6, the control flow goes to step SB7 to determine whether the identification code of the apparatus 12 for communication with a radio-frequency tag from which the message reading command has been received is identical with the identification code stored as the receiver address in the receiver identification code storage section 72. If an affirmative determination is obtained in step SB7, the control flow goes to step SB8 to transmit the message to the apparatus 12 for communication with a radio-frequency tag from which the message reading command has been received, and the present relay tag control routine is terminated. If a negative determination is obtained in step SB7, the control flow goes to step SB9 to transmit, to the apparatus 12 for communication with a radio-frequency tag from which the message reading command has been received, a message informing that there is not any message addressed to the apparatus 12 for communication with a radio-frequency tag in question. The present relay tag control routine is terminated with the termination of step SB9. If a negative determination is obtained in step SB6, the control flow goes to step SB10 to determine whether the received signal is the first or second message erasing command. If a negative determination is obtained in step SB10, the present relay tag control routine is terminated. If an affirmative determination is obtained in step SB10, the control flow goes to step SB11 to determine whether the identification code of the apparatus 12 for communication with a radio-frequency tag from which the first or second message erasing command is identical with the identification code stored as the receiver address in the receiver identification code storage section 72. If an affirmative determination is obtained in step SA11, the control flow goes to step SB13 to erase the message which is stored in the message storage portion 68 and which has already been received by the apparatus 12 for communication with a radio-frequency tag from which the first message erasing command has been received. The present relay tag control routine is terminated with the termination of step SB13. If a negative determination is obtained in step SB11, the control flow goes to step SB12 to determine whether the identification code of the apparatus 12 for communication with a radio-frequency tag from which the first or second message erasing command has been received is identical with the identification code stored as the transmitter address in the transmitter identification code storage section 70. If an affirmative determination is obtained in step SB12, the control flow goes to step SB13 to erase the message which is stored in the message storage portion 68 and which has already been received by the apparatus 12 for communication with a radio-frequency tag the identification code of which is stored in the receiver identification code storage section 72. If a negative determination is obtained in step SB12, the present relay tag control routine is terminated.

In the present embodiment described above, the apparatus 12 for communication with a radio-frequency tag includes the transmitted-signal generating portion 46 (steps SA2, SA3, SA5, SA6 and SA8) configured to transmit, to radio-frequency tag 14a, 14b functioning as the relay tag, a message writing command for writing on the radio-frequency tag 14a, 14b a desired message to be transmitted to another apparatus 12 for communication with a radio-frequency tag via the radio-frequency tag 14a, 14b. Since the message to be transmitted to another apparatus 12 for communication with a radio-frequency tag is written on the relay tag 14a, 14b, the message can be transmitted from the relay tag 14a, 14b to the apparatus 12 for communication with a radio-frequency tag (receiver) which is comparatively distant from the apparatus for communication with a radio-frequency tag in question (transmitter). Namely, the present embodiment provides a technique which permits highly reliable communication among the plurality of apparatus 12 for communication with a radio-frequency tag, with an arrangement of each apparatus for communication with a radio-frequency tag which is similar to that for ordinary communication with the radio-frequency tags 14.

The present embodiment is further arranged such that the desired message to be written on the radio-frequency tag includes an identification code of another apparatus 12 for communication with a radio-frequency tag which is a receiver of the desired message to be transmitted to the apparatus 12 for communication with a radio-frequency tag in question (transmitter). Thus, the receiver of the message is identified by the identification code included in the message.

The present embodiment is further arranged such that the desired message to be written on the radio-frequency tag includes an identification code of the apparatus 12 for communication with a radio-frequency tag in question which is a transmitter of the desired message. Accordingly, the apparatus 12 for communication with a radio-frequency tag which is the receiver of the message can recognize the apparatus 12 for communication with a radio-frequency tag which is the transmitter of the message.

The present embodiment is further arranged such that the transmitted-signal generating portion 46 is configured to generate the first message erasing command and transmit to the relay tag 14a, 14b the first message erasing command asking the relay tag 14a, 14b to erase the message which has been transmitted from another apparatus 12 for communication with a radio-frequency tag via the relay tag 14a, 14b to the apparatus 12 for communication with a radio-frequency tag in question which is the receiver of the message the identification code of which is stored in the relay tag 14a, 14b. Thus, the receiver of the message can command the relay tag 14a, 14b to erase the message which is stored in the relay tag 14a, 14b and which has been transmitted from the transmitter to the receiver, so that the message storage portions 68 of the relay tag 14a, 14b can be used for storing new messages.

The present embodiment is further arranged such that the transmitted-signal generating portion 46 is configured to generate the second message erasing command and transmit to the relay tag 14a, 14b the second message erasing command asking the radio-frequency tag to erase the desired message which has been transmitted to the relay tag 14a, 14b from the apparatus 12 for communication with a radio-frequency tag in question which is the transmitter of the desired message the identification code of which is stored in the relay tag 14a, 14b. Thus, the transmitter of the desired message can command the relay tag 14a, 14b to erase the message stored in the relay tag 14a, 14b, after the message has been transmitted to another apparatus 12 for communication with a radio-frequency tag (receiver), or if the transmitter does not now intend to transmit the desired message to the receiver. Accordingly, the message storage portions 68 can be used for storing new messages.

The present embodiment is further arranged such that the transmitted-signal generating portion 46 is configured to generate the replying command and transmit to said relay tag 14a, 14b the replying command for writing on the relay tag 14a, 14b the reply message acknowledging normal reception of the message by the apparatus 12 for communication with a radio-frequency tag in question (receiver) from another apparatus 12 for communication with a radio-frequency tag (transmitter) via said radio-frequency tag. Thus, the receiver of the message can inform the transmitter of the message that the message has been normally received by the receiver.

The present embodiment is further arranged such that the transmitted-signal generating portion 46 is configured to generate the message reading command and the message writing command and transmit to the relay tag 14a, 14b the message reading command for reading the message written on the relay tag 14a, 14b, and the message writing command for writing the message on the relay tag 14a, 14b. Thus, the apparatus 12 for communication with a radio-frequency tag in question can read the message written on the relay tag 14a, 14b, and write the message on the relay tag 14a, 14b, with a high degree of reliability.

The present embodiment is further arranged such that the transmitted-signal generating portion 46 is configured to generate the message checking command and transmit to the neighboring or surrounding tags 14 said message checking command asking these radio-frequency tags to reply to said message checking command if each of the surrounding radio-frequency tags 14 stores a message including the identification code of the apparatus 12 for communication with a radio-frequency tag in question, as the address of the receiver of the message stored in that surrounding radio-frequency tag 14.

Thus, the receiver of the message can find any of the surrounding radio-frequency tags 14 which stores the message to be addressed to that receiver, by transmitting the message checking command to the surrounding radio-frequency tags 14.

The present embodiment is further arranged such that the transmitted-signal generating portion 46 the transmitter portion repeatedly transmits the message checking command to the surrounding radio-frequency tags 14 at the predetermined time interval. Accordingly, the receiver of the message can find, without a delay, any of the surrounding radio-frequency tags 14 which stores the message to be addressed to the receiver, by repeatedly transmitting the message checking command at the predetermined time interval.

The present embodiment is further arranged such that each radio-frequency tag 14 functioning as a relay tag includes the plurality of message storage portions 68, which store respective messages transmitted from the respective apparatus for communication with a radio-frequency tag. Accordingly, the radio-frequency tag 14 can efficiently function as the relay tag through which each message can be transmitted from one of the apparatus 12 for communication with a radio-frequency tag to another. In addition, the message storage portions 68 can store a plurality of messages, the radio-frequency tag 14 can function as the relay tag between two apparatus for communication with a radio-frequency tag of each of a plurality of different pairs of the communication devices. Thus, the present second embodiment provides a technique which permits highly reliable radio communication among the plurality of apparatus 12 for communication with a radio-frequency tag, with a simple arrangement of each apparatus 12 for communication with a radio-frequency tag.

The present embodiment is further arranged such that each of the plurality of message storage portions 68 includes the transmitter identification code storage section 70 for storing the identification code of the apparatus 12 for communication with a radio-frequency tag which is the transmitter of the desired message. Accordingly, the transmitter of the message stored in each message storage portion 68 can be identified by the identification code stored in the transmitter identification code storage section 70 of the message storage portion 68.

The present embodiment is further arranged such that each of the plurality of message storage portions 68 includes the receiver identification code storage section 72 for storing the identification code of the apparatus 12 for communication with a radio-frequency tag which is the receiver of the desired message. Accordingly, the receiver of the message stored in each message storage portion 68 can be identified by the identification code stored in the receiver identification code storage section 70 of the message storage portion 68.

The present embodiment is further arranged such that the relay tag 14a, 14b is configured to be operable, in response to the first message erasing command received from the apparatus 12 for communication with a radio-frequency tag in question, to erase the message stored in the message storage portion 68 the receiver identification code storage section 72 of which stores the identification code of the receiver of the message, which identification code is identical with the identification code of the apparatus 12 for communication with a radio-frequency tag in question from which the first message erasing command has been received. Thus, the receiver of the message can command the relay tag 14a, 14b to erase the message stored in the message storage portion 68, after the message has been received by the receiver via the relay tag 14a, 14b.

The present embodiment is further arranged such that the relay tag 14a, 14b is configured to be operable, in response to the second message erasing command received from the apparatus 12 for communication with a radio-frequency tag in question, to erase the message stored in the message storage portion 68 the transmitter identification code storage section 70 of which stores the identification code of the transmitter of the message, which identification code is identical with the identification code of the apparatus 12 for communication with a radio-frequency tag in question from which the second message erasing command has been received. Thus, the transmitter of the message can command the relay tag 14a, 14b to erase the message stored in the message storage portion 68, after the message has been transmitted from the transmitter to the receiver via the relay tag 14a, 14b, or the transmitter does not now intend to transmit the message to the receiver.

The present embodiment is further arranged such that when the relay tab 14a, 14b has received the message checking command from the apparatus 12 for communication with a radio-frequency tag, the relay tag 14a, 14b transmits to that apparatus 12 for communication with a radio-frequency tag its identification code (relay tag ID) if the identification code of the apparatus 12 for communication with a radio-frequency tag from which the message checking command has been received is identical with the identification code stored in the receiver identification code storage section 72. Accordingly, it is possible to notify the receiver of the message that the message addressed to the receiver is stored in the relay tag 14a, 14b.

The present embodiment is further arranged such that the relay tag 14a, 14b further comprises the relay-station identification code storage portion 66 for storing the identification code of the relay tag functioning as a relay station for transmission of the message among the plurality of apparatus 12 for communication with a radio-frequency tag. Thus, the relay tags 14a, 14b can be distinguished from the other or non-relay tags 14.

The present embodiment is further arranged such that the message storage portion 68 is constituted by a non-volatile memory formed of a ferroelectric material. Accordingly, the message can be written and read on and from the message storage portion 68, with the same amount of consumption of an electric energy, and the maximum distance between the radio-frequency tag 14 and the apparatus 12 for communication with a radio-frequency tag can be increased.

In the radio-frequency tag communication system 10 according to the present embodiment, the transmission of the message from one of the plurality of apparatus 12 for communication with a radio-frequency tag to another of the plurality of apparatus 12 for communication with a radio-frequency tag is effected via the relay tag 14a, 14b. Accordingly, the message can be transmitted among the plurality of apparatus 12 for communication with a radio-frequency tag, without using a special communication protocol or a special device for communication among the apparatus for communication with a radio-frequency tag. Thus, the present embodiment provides a technique which permits highly reliable radio communication among the plurality of apparatus 12 for communication with a radio-frequency tag, with an arrangement of each apparatus for communication with a radio-frequency tag which is similar to that for ordinary communication with the radio-frequency tags 14.

In the method of radio communication according to the present embodiment, the transmission of the message from one of the plurality of apparatus for communication with a radio-frequency tag to another of the plurality of apparatus for communication with a radio-frequency tag is effected via one of the at least one radio-frequency tag, which functions as a relay tag. Accordingly, the message can be transmitted among the plurality of apparatus for communication with a radio-frequency tag, without using a special communication protocol or a special device for communication among the apparatus for communication with a radio-frequency tag. Thus, the present embodiment provides a technique which permits highly reliable radio communication among the plurality of apparatus for communication with a radio-frequency tag, with an arrangement of each apparatus for communication with a radio-frequency tag which is similar to that for ordinary communication with the radio-frequency tags.

As described above, the present embodiment is arranged such that when the relay tab 14a, 14b has received the message checking command from the apparatus 12 for communication with a radio-frequency tag, the relay tag 14a, 14b transmits to that apparatus 12 for communication with a radio-frequency tag its identification code (relay tag ID) if the identification code of the apparatus 12 for communication with a radio-frequency tag from which the message checking command has been received is identical with the identification code stored in the receiver identification code storage section 72. In this case, however, the relay tag 14a, 14b may transmit to the above-indicated apparatus 12 for communication with a radio-frequency tag the message including the identification code stored in the receiver identification code storage section 72. If the apparatus 12 for communication with a radio-frequency tag can normally receive the message, the apparatus 12 for communication with a radio-frequency tag need not implement the steps SA4' and SA4" of the flow chart of FIG. 6.

Other embodiments of this invention will be described by reference to FIGS. 8-17. In the following embodiments, the same reference signs as used in the first embodiment of FIGS. 1-7 will be used to identify the functionally corresponding elements, which will not be described redundantly.

Embodiment 2

Figure 8:
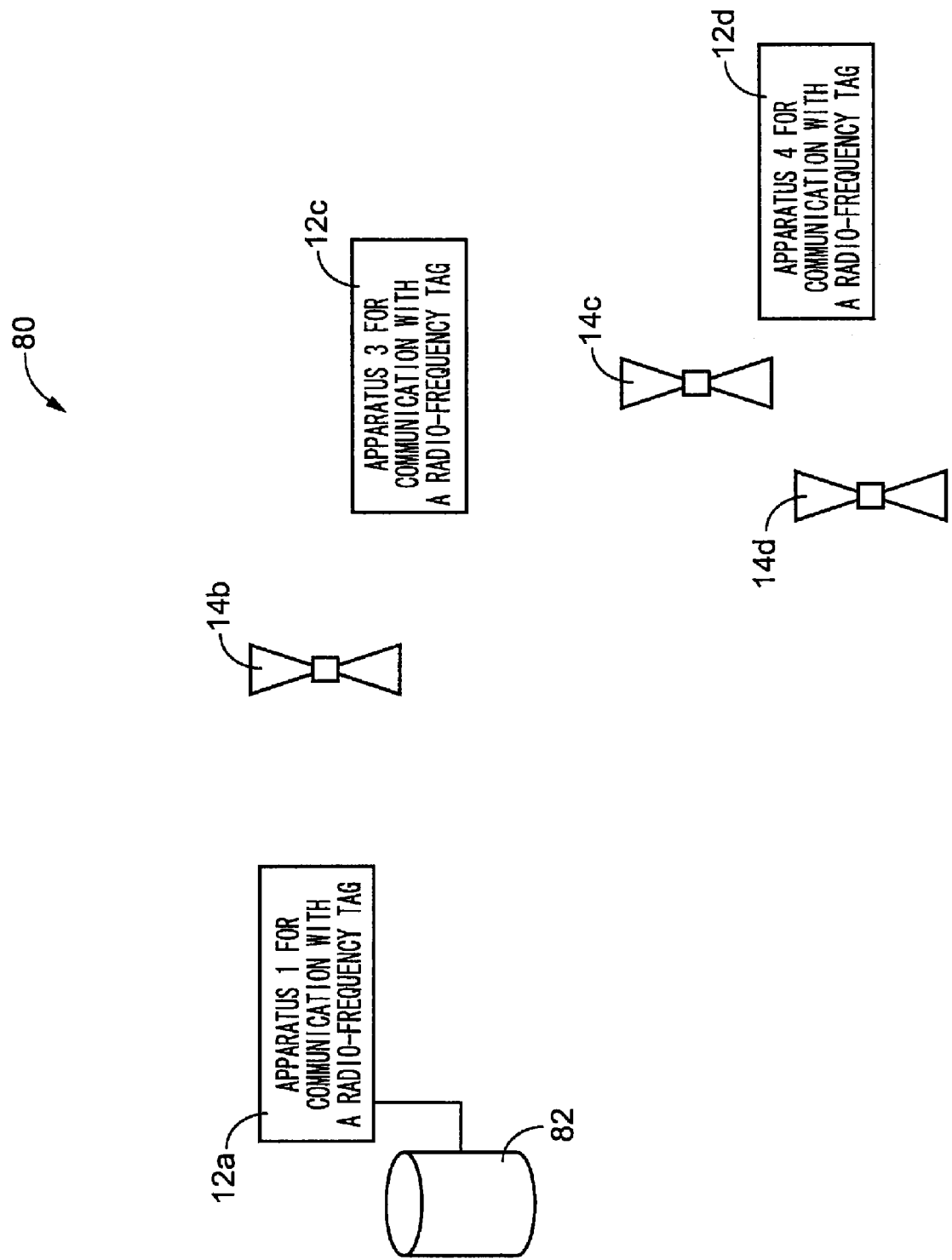
FIG. 8 is a view showing a radio-frequency communication system constructed according to a second embodiment of this invention.

Referring to FIG. 8, there is shown a radio-frequency communication system 80 constructed according to a second embodiment of this invention. This radio-frequency communication system 80 includes: an apparatus for communication with a radio-frequency tag 12a having an identification code [AA01]; an apparatus for communication with a radio-frequency tag 12b having an identification code [AA02]; an apparatus for communication with a radio-frequency tag 12c having an identification code [AA03]; an apparatus for communication with a radio-frequency tag 12d having an identification code [¥aa04]; a radio-frequency tag 14a having an identification code [BB0A]; a radio-frequency tag 14b having an identification code [BB0B]; a radio-frequency tag 14c having an identification code [BB0C]; and a radio-frequency tag 14d having an identification code [BB0D]. The apparatus 12a for communication with a radio-frequency tag has a memory device 82 storing information relating to radio communication within the radio-frequency communication system 80. The memory device 82 functions as a server in the radio-frequency communication system 80. It is noted that FIG. 8 shows the radio-frequency communication system 80 while the apparatus 12a, 12c and 12d for communication with a radio-frequency tag having the respective identification codes [AA01], [AA03] and [AA04], and the radio-frequency tags 14b, 14c and 14d having the respective identification codes [BB0B], [BB0C] and [BB0D] are placed in their on state.

Figure 9:
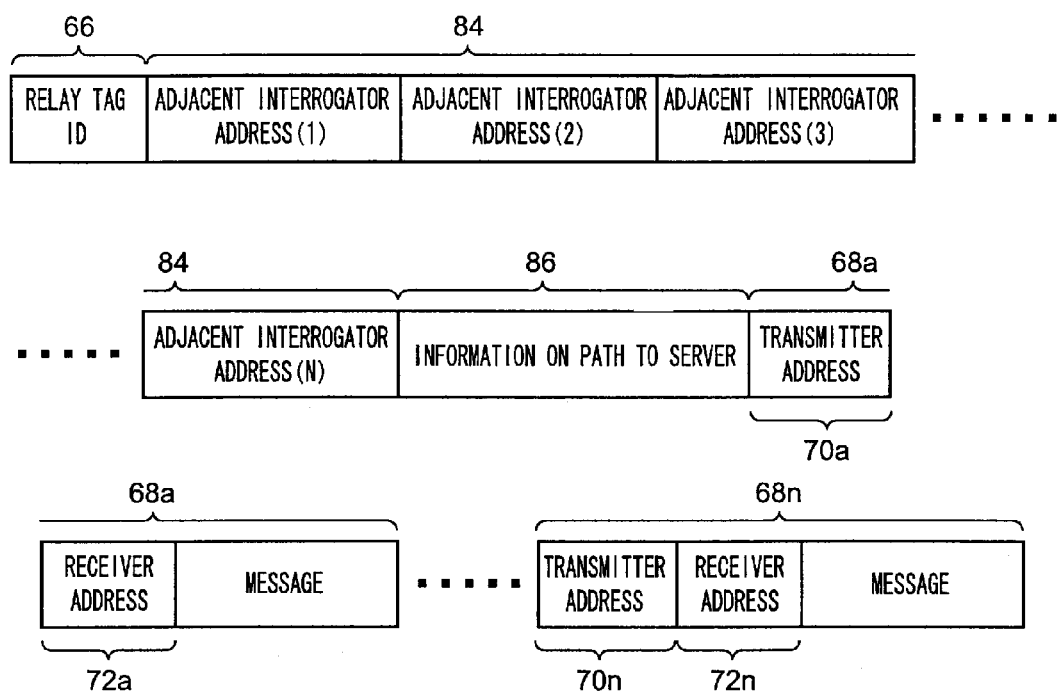
FIG. 9 is a view showing an arrangement of storage portions of a memory portion of a radio-frequency tag included in the radio-frequency communication system of FIG. 8, which are provided to enable the radio-frequency tag to function as a relay tag.

Referring to next FIG. 9, there is shown an arrangement of storage portions of the memory portion 60 of each radio-frequency tag 14 included in the radio-frequency communication system 80 of the present second embodiment, which storage portions are provided to enable the radio-frequency tag 14 to function as a relay tag. As shown in FIG. 9, the memory portion 60 of each radio-frequency tag 14 includes, in addition to the above-described relay-station identification code storage portion 66 and the message storage portions 68: an adjacent-station identification code storage portion 84 for storing identification codes of the adjacent apparatus 12 for communication with a radio-frequency tag, in the form of adjacent-interrogator addresses, together with updated times (times at which messages were written in the message storage portion 68); and a path-information storage portion 86 for storing information on a path to the server (apparatus 12a for communication with a radio-frequency tag provided with the memory device 82) of the radio-frequency communication device 80.

In the radio-frequency communication system 80 constructed as shown in FIG. 8, the radio-frequency tag 14b having the identification code [BB0B] is located in an area in which the apparatus 12a for communication with a radio-frequency tag having the identification code [AA01] and the apparatus 12c for communication with a radio-frequency tag having the identification code [AA03] can communicate with the radio-frequency tag 14b. Accordingly, the adjacent-station identification code storage portion 84 of the radio-frequency tag 14b functioning as a relay tag stores the address [AA01] of the apparatus 12a for communication with a radio-frequency tag and the address [AA03] of the apparatus 12c for communication with a radio-frequency tag, together with the updated times. Further, the radio-frequency tag 14c having the identification code [BB0C] is located in an area in which the apparatus 12c for communication with a radio-frequency tag having the identification code [AA03] and the apparatus 12d for communication with a radio-frequency tag having the identification code [AA04] can communicate with the radio-frequency tag 14c. Accordingly, the adjacent-station identification code storage portion 84 of the radio-frequency tag 14c also functioning as a relay tag stores the address [AA03] of the apparatus 12c for communication with a radio-frequency tag and the address [AA04] of the apparatus 12d for communication with a radio-frequency tag, together with the updated times. The radio-frequency tag 14d having the identification code [BB0D] is located in an area in which the apparatus 12d for communication with a radio-frequency tag having the identification code [AA04] can communicate with the radio-frequency tag 14d. Accordingly, the adjacent-station identification code storage portion 84 of the radio-frequency tag 14d also functioning as a relay tag stores the address [AA04] of the apparatus for communication with a radio-frequency tag 14d, together with the updated time.

The radio-frequency tag 14b functioning as the relay tag can obtain a direct access to the apparatus 12a for communication with a radio-frequency tag functioning as the server. Accordingly, the path-information storage portion 86 of the radio-frequency tag 14b stores the identification code [AA01] of the apparatus 12a for communication with a radio-frequency tag. The radio-frequency tag 14c also functioning as the relay tag can obtain an access to the apparatus 12a for communication with a radio-frequency tag functioning as the server, through the apparatus 12c for communication with a radio-frequency tag and the radio-frequency tag 14b. Accordingly, the path-information storage portion 86 of the radio-frequency tag 14c stores a series [AA03BB0BAA01] of the identification code [AA03] of the apparatus 12c for communication with a radio-frequency tag, the identification code [BB0B] of the radio-frequency tag 14b and the identification code [AA01] of the apparatus 12a for communication with a radio-frequency tag. The radio-frequency tag 14d also functioning as the relay tag can obtain an access to the apparatus 12a for communication with a radio-frequency tag functioning as the server, through the apparatus 12d for communication with a radio-frequency tag, the radio-frequency tag 14c, the apparatus 12c for communication with a radio-frequency tag and the radio-frequency tag 14b. Accordingly, the path-information storage portion 86 of the radio-frequency tag 14d stores a series [AA04BB0CAA03BB0BAA01] of the identification code [AA04] of the apparatus 12d for communication with a radio-frequency tag, the identification code [BB0C] of the radio-frequency tag 14c, the identification code [AA03] of the apparatus 12c for communication with a radio-frequency tag, the identification code [BB0B] of the radio-frequency tag 14b and the identification code [AA01] of the apparatus 12a for communication with a radio-frequency tag. Similarly, the radio-frequency tag 12c stores a series [BB0BAA01] as path information, while the radio-frequency tag 12d stores a series [BB0CAA03BB0BAA01] as path information.

Figure 10:
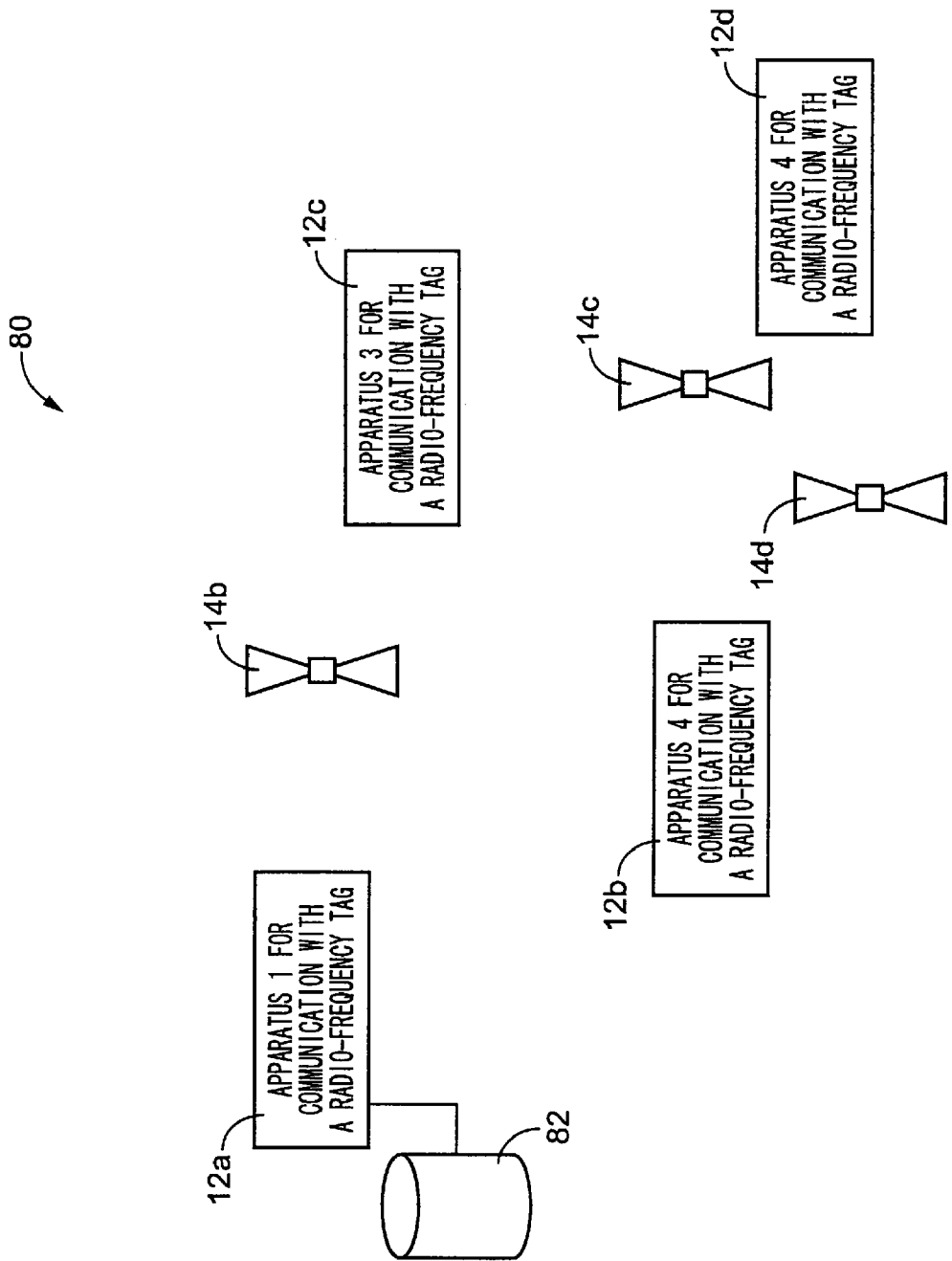
FIG. 10 is a view for explaining the radio-frequency communication system of FIG. 8 after another apparatus for communication with a radio-frequency tag is newly placed in its on state.

FIG. 10 shows the radio-frequency communication system 80 after the apparatus 12b for communication with a radio-frequency tag is newly placed in its on state. The radio-frequency tag 14d is located in an area in which the apparatus 12b for communication with a radio-frequency tag can communicate with the radio-frequency tag 14d. Accordingly, the apparatus 12b for communication with a radio-frequency tag can detect the radio-frequency tag 14d, by performing a search for any relay tag. When the radio-frequency tag 12b has detected the radio-frequency tag 14d in this manner, the apparatus 12b for communication with a radio-frequency tag transmits to the radio-frequency tag 14d a writing command for writing the adjacent-interrogator address, so that the identification code or address [AA02] of the radio-frequency tag 12b and the updated time are stored in the adjacent-station identification code storage section 84 of the radio-frequency tag 14d functioning as the relay tag. Then, the apparatus 12b for communication with a radio-frequency tag reads in the path information from the path-information storage portion 86 of the radio-frequency tag 14d. Since the apparatus 12b for communication with a radio-frequency tag has just been turned on, this apparatus 12b for communication with a radio-frequency tag does not store path information indicative of a path from the apparatus 12b for communication with a radio-frequency tag to the apparatus 12a for communication with a radio-frequency tag functioning as the server. Accordingly, upon reading the path information from the path-information storage portion 86 of the radio-frequency tag 14d, the apparatus 12b for communication with a radio-frequency tag stores a series [BB0DAA04BB0CAA03BB0BAA01] as the path information indicative of the path from the apparatus 12b for communication with a radio-frequency tag to the apparatus 12a for communication with a radio-frequency tag functioning as the server. The series [BB0DAA04BB0CAA03BB0BAA01] is obtained by adding the identification code [BB0D] of the radio-frequency tag 14d to the series [AA04BB0CAA03BB0BAA01] stored in the radio-frequency tag 14d. This series [BB0DAA04BB0CAA03BB0BAA01] including the identification code [BB0D] of the radio-frequency tag 14d is stored in the radio-frequency tag 12b even if this radio-frequency tag 12b has been moved from anywhere else to the position adjacent to the radio-frequency tag 14d, since in the area communication of the apparatus 12b for communication with a radio-frequency tag, there is not a relay tag identified by the identification code stored in the leading portion of the path information stored in the apparatus 12b for communication with a radio-frequency tag. After the path information stored in the apparatus 12b for communication with a radio-frequency tag has been updated as described above, the apparatus 12b for communication with a radio-frequency tag performs a search for any other radio-frequency tag 14 functioning as a relay tag. In the communication system 10 as shown in FIG. 10, there is not any relay tag except the radio-frequency tag 14d, in the area of communication of the apparatus 12b for communication with a radio-frequency tag.

Then, the apparatus 12b for communication with a radio-frequency tag performs radio communication to search for any message addressed to itself. Described in detail, the transmitted-signal generating portion 46 of the apparatus 12b for communication with a radio-frequency tag is operated to generate the message checking command and transmit the message checking command to the surrounding radio-frequency tags 14. Usually, there is not any message addressed to the apparatus 12b for communication with a radio-frequency tag immediately after the communication device 12b has been turned on. In this case, the apparatus 12b for communication with a radio-frequency tag then performs radio communication to search for any ordinary radio-frequency tags 14 not functioning as the relay tag, namely, any radio-frequency tags 14 affixed to articles of commodity. These non-relay tags 14 have respective identification codes which are different from those of the relay tags 14. By transmitting suitable searching commands such as "PING" and "Scroll ID" for limiting the identification codes to those of the non-relay tags 14, these non-relay tags 14 can be effectively detected. It is noted that these non-relay tags 14 affixed to the articles of commodity are not shown in FIGS. 8, 10 and 11. If any non-relay tag 14 is detected by the apparatus 12a-12d for communication with a radio-frequency tag, the identification code of the detected non-relay tag 14 and the identification code of the apparatus 12 for communication with a radio-frequency tag which has detected the non-relay tag 14 are transmitted to the apparatus 12a for communication with a radio-frequency tag which functions as the server. If a non-relay tag 14f having an identification code [CC0F] is detected by the apparatus 12b for communication with a radio-frequency tag, for example, the apparatus 12b for communication with a radio-frequency tag transmits to the relay tag 14d functioning as the relay tag, a message [000AAA02CC0F] which is a series of a code [000A] indicating that any non-relay tag affixed to an article of commodity has been detected, the identification code [AA02] of the apparatus 12b for communication with a radio-frequency tag which detected the non-relay tag 14f, and the identification code [CC0F] of the detected non-relay tag 14f. The address of the transmitter of the message [000AAA02CC0F] is the identification code [AA02] of the apparatus 12b for communication with a radio-frequency tag which detected the non-relay tag 14f, and the address of the receiver of the message is the identification code [AA04] of the apparatus 12d for communication with a radio-frequency tag with which the apparatus 12b for communication with a radio-frequency tag can communicate via the relay tag 14d. When the apparatus 12d for communication with a radio-frequency tag has received the above-indicated message, the apparatus 12d for communication with a radio-frequency tag transmits to the relay tag 14d a message erasing command for erasing the message stored in the relay tag 14d, and transmits to the radio-frequency tag 12b, an replying message acknowledging normal reception of the message from the radio-frequency tag 12b via the relay tag 14d. At the same time, the apparatus 12d for communication with a radio-frequency tag transmits the message [000AAA02CC0F] (received from the apparatus 12b for communication with a radio-frequency tag) to the apparatus 12c for communication with a radio-frequency tag via the relay tag 14c. Similarly, the message [000AAA02CC0F] is transmitted from the apparatus 12c for communication with a radio-frequency tag via the relay tag 14b to the radio-frequency tag 12a functioning as the server. A message on the non-relay tag 14 affixed to an article of commodity need not be transmitted to the server each time this non-relay tag 14 is detected, and this message is preferably transmitted to the server when the non-relay tag 14 in question is detected for the first time, or when this non-relay tag 14 disappears. All of the apparatus 12 for communication with a radio-frequency tag can obtain the information indicative of the path to the apparatus 12a for communication with a radio-frequency tag functioning as the server, by reference to the path information stored in the path-information storage portion 86 of each relay tag 14. On the other hand, the apparatus 12a for communication with a radio-frequency tag functioning as the server keeps a list of the apparatus 12 for communication with a radio-frequency tag located adjacent to each article of commodity (affixed to each non-relay tag 14), so that the plurality of non-relay tags 14 and the articles of commodity to which the non-relay tags 14 are affixed can be administered or managed in a coordinated fashion.

Figure 11:
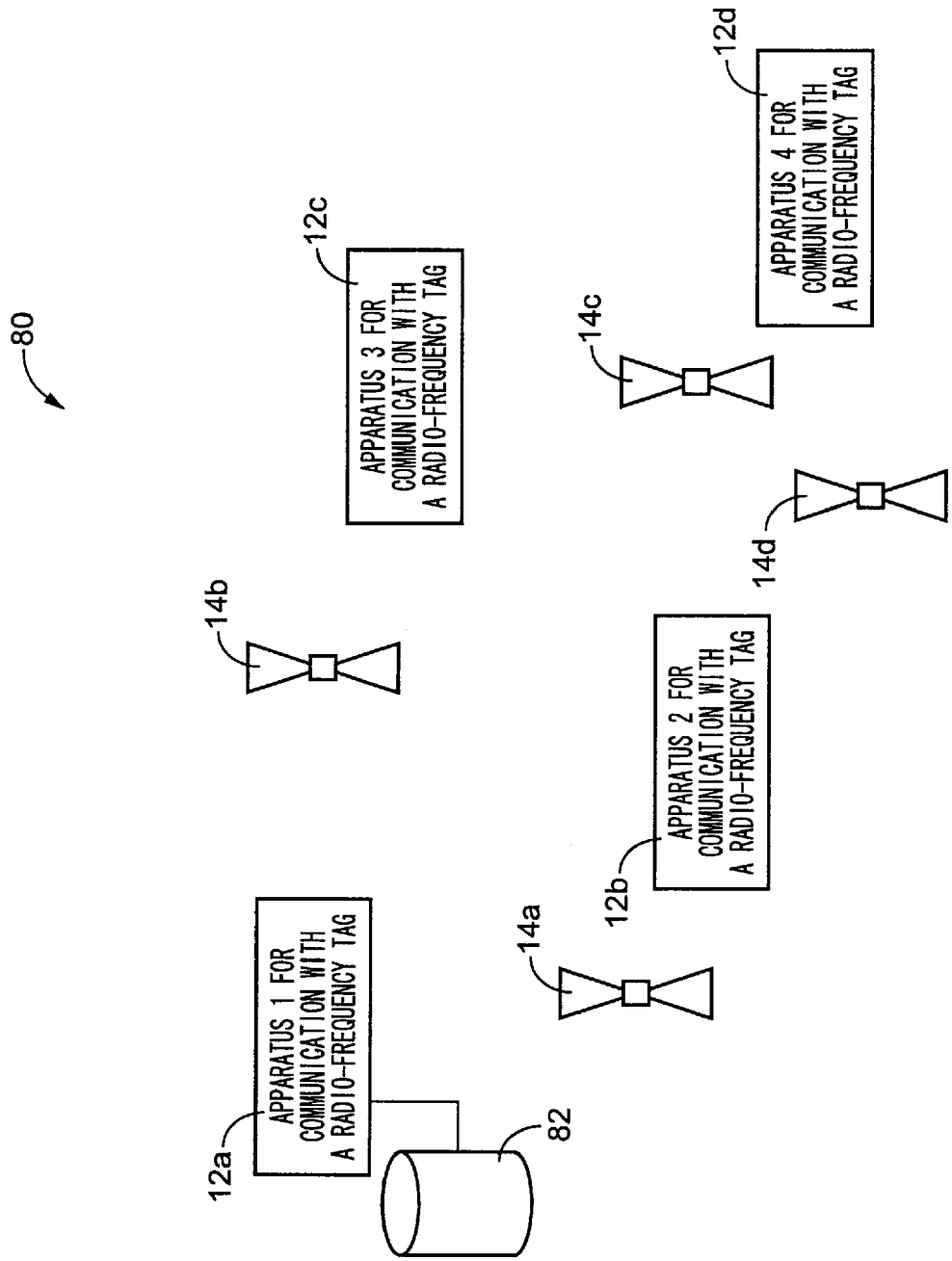
FIG. 11 is a view for explaining the radio-frequency communication system of FIG. 8 after another radio-frequency tag functioning as a relay tag is newly placed in its on state.

FIG. 11 shows the radio-frequency communication system 80 after the radio-frequency tag 14a functioning as a relay tag is newly placed in its on state. In the example of FIG. 11, the radio-frequency tag 14a having the identification code [BB0A] and functioning as the relay tag is located in an area in which the apparatus 12a for communication with a radio-frequency tag having the identification code [AA01] and the apparatus 12b for communication with a radio-frequency tag having the identification code [AA02] can communicate with the relay tag 14a. Where the apparatus 12b for communication with a radio-frequency tag detects the relay tag 14a before the apparatus 12a for communication with a radio-frequency tag, the path information [AA02BB0DAA04BB0CAA03BB0BAA01] including the identification code [BB0B] of the apparatus 12b for communication with a radio-frequency tag is stored in the path-information storage portion 86 of the relay tag 14a. When the apparatus 12a for communication with a radio-frequency tag subsequently reads the path information stored in the relay tag 14a, the apparatus 12a for communication with a radio-frequency tag compares the length of the path information stored in the relay tag 14a with that of the path information stored in the apparatus 12a for communication with a radio-frequency tag, to determine whether the length of the path from the relay tag 14a directly to the server (communication device 12a in question) is shorter. If an affirmative determination is obtained by the apparatus 12a for communication with a radio-frequency tag, the path information [AA02BB0DAA04BB0CAA03BB0BAA01] stored in the relay tag 14a is changed to [AA01]. When the path information stored in the relay tag 14a is subsequently read by the apparatus 12b for communication with a radio-frequency tag, a determination that the length of the path from the apparatus 12b for communication with a radio-frequency tag to the apparatus 12a for communication with a radio-frequency tag (server) via the relay tag 14a is shorter is made, the path information stored in the apparatus 12b for communication with a radio-frequency tag is changed to [BB0AAA01]. Thus, the shortest path to the server is selected when the relay tag 14a is newly placed in its on state.

Referring to the flow chart of FIG. 12, there will be described an RFID communication control routine executed by the DSP 16 of each apparatus 12 for communication with a radio-frequency tag included in the radio-frequency communication system 80 of FIG. 8, to effect radio communication with the radio-frequency tags 14. This RFID communication control routine is repeatedly executed with a predetermined cycle time.

Figure 12:
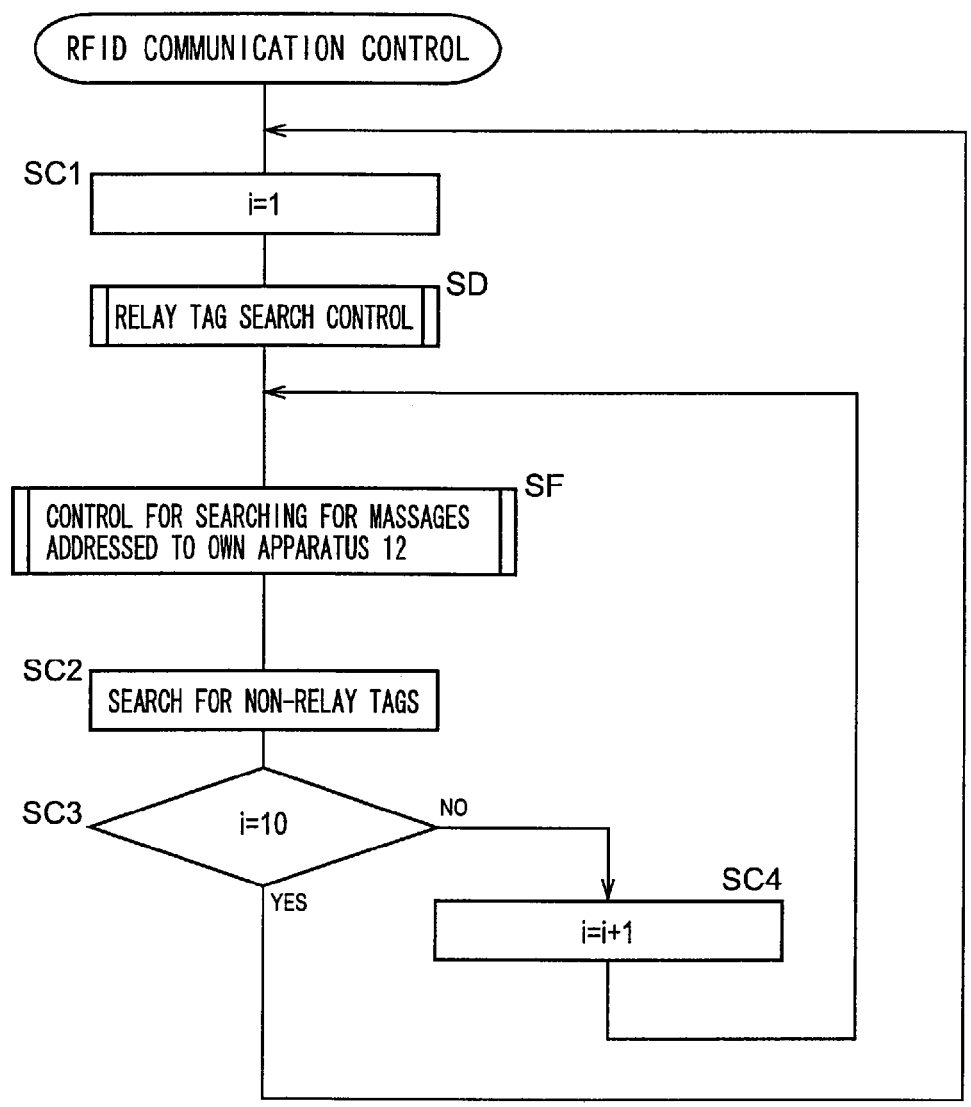
FIG. 12 is a flow chart illustrating an RFID communication control routine executed by a DSP of the apparatus for communication with a radio-frequency tag included in the radio-frequency communication system of FIG. 8, to effect radio communication with the radio-frequency tags.

The RFID communication control routine of FIG. 12 is initiated with step SC1 to set a variable "i" to 1. Then, the control flow goes to step SD to execute a relay tag search control routine illustrated in the flow chart of FIG. 13. Then, step SF is implemented to execute a control routine illustrated in the flow chart of FIG. 15, for searching messages addressed to the own apparatus 12 for communication with a radio-frequency tag. Then, the control flow goes to step SC2 to search for the non-relay tags 14 affixed to articles of commodity, and to step SC3 to determine whether the variable "i" is equal to 10. If a negative determination is obtained in step SC3, the control flow goes to step SC4 to increment the variable "i" by 1, and goes back to step SF. If an affirmative determination is obtained in step SC3, the control flow goes back to step SC1. It will be understood that that a portion of the DSP 16 assigned to implement steps SD2, SF and SC2 constitutes the transmitted-signal generating portion 46.

Figure 13:
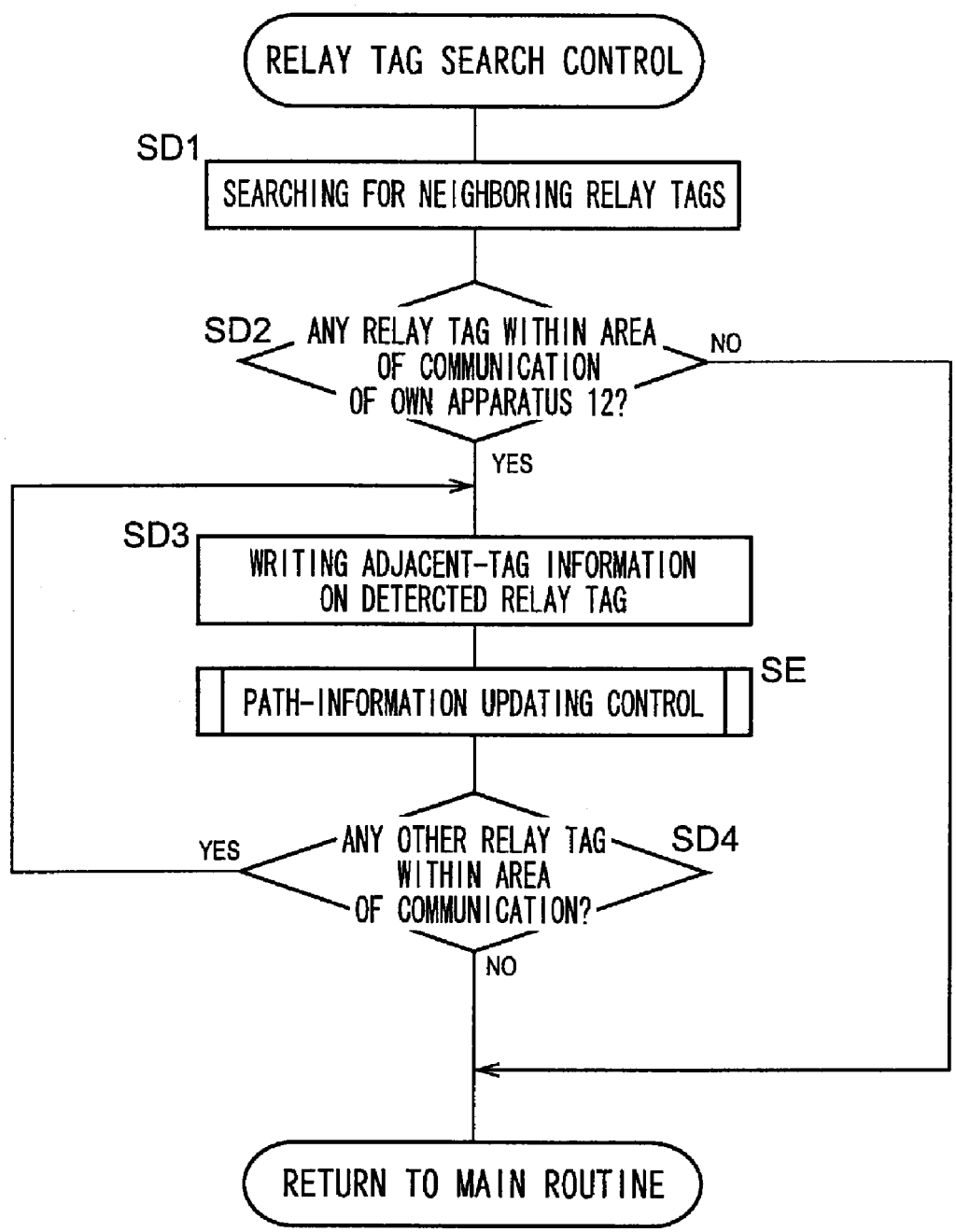
FIG. 13 is a flow chart illustrating a relay tag search control routine executed in a step of the RFID communication control routine of FIG. 12.

The relay tag search control routine of FIG. 13 is initiated with step SD1 to search for the neighboring radio-frequency tags 13 functioning as relay tags. Then, the control flow goes to step SD2 to determine whether there exists any relay tag 14 within an area of communication of the apparatus 12 for communication with a radio-frequency tag in question. If a negative determination is obtained in step SD2, the control flow goes back to the main routine, that is, the RFID communication control routine of FIG. 12. If an affirmative determination is obtained in step SD2, the control flow goes to step SD3 to effect radio communication with the detected relay tag 14, for writing adjacent tag information together with the present time, in the adjacent-station identification code storage portion 84. Then, step SE is implemented to execute a path-information updating control routine illustrated in the flow chart of FIG. 14. Then, the control flow goes to step SD4 to determine whether there exists any other relay tag 14 within the area of communication of the apparatus 12 for communication with a radio-frequency tag in question. If an affirmative determination is obtained in step SD4, the control flow goes back to step SD3 and the following steps. If a negative determination is obtained in step SD4, the control flow goes back to the main routine of FIG. 12.

Figure 14:
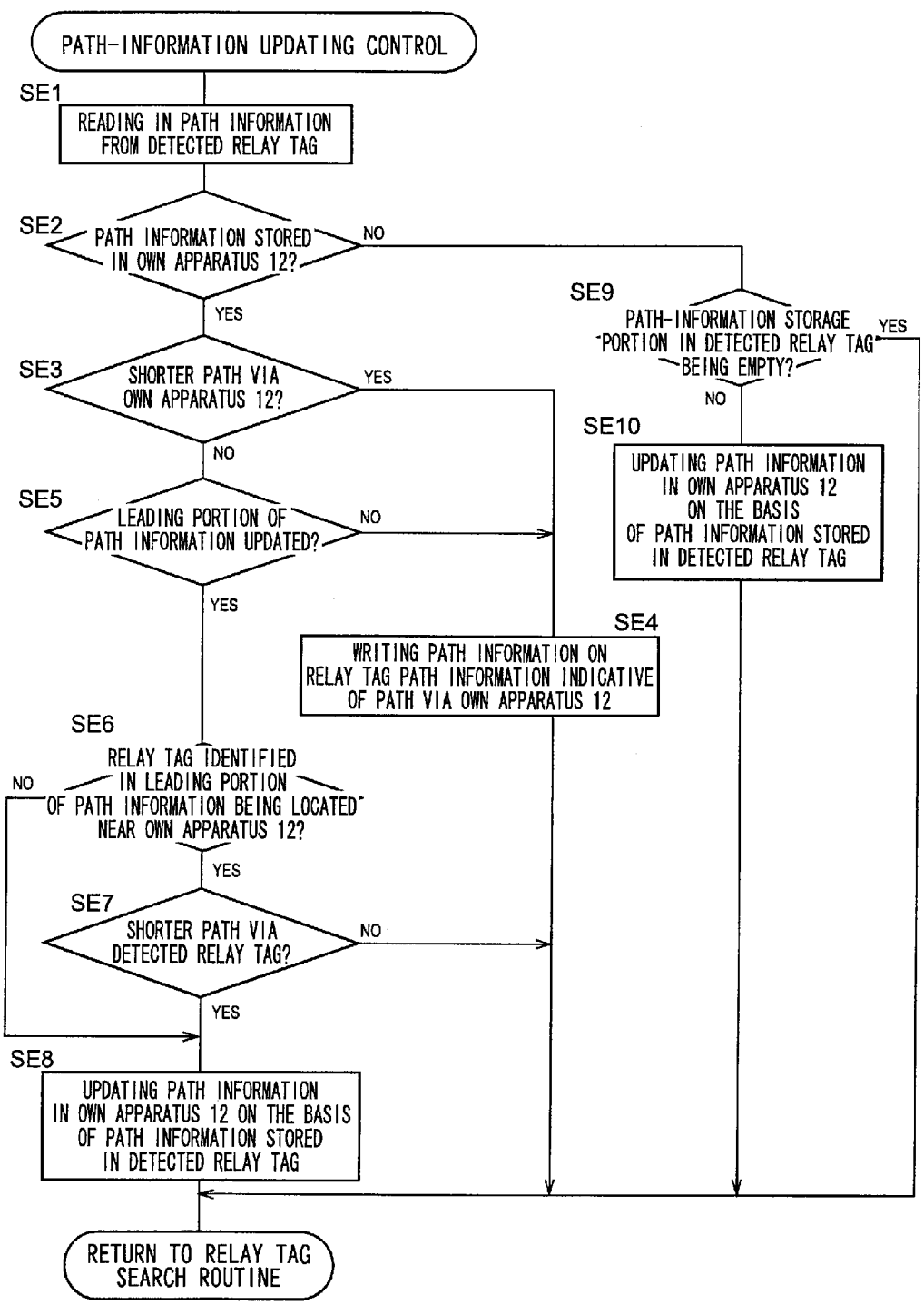
FIG. 14 is a flow chart illustrating a path-information updating control routine executed in a step of the RFID communication control routine of FIG. 12.

The path-information updating control routine of FIG. 14 is initiated with step SE1 to effect radio communication with the detected relay tag 14, for reading in the path information stored in the path-information storage portion 86 of the detected relay tag 14. Then, the control flow goes to step SE2 to determine whether any path information is stored in the apparatus 12 for communication with a radio-frequency tag in question. If a negative determination is obtained in step SE2, the control flow goes to step SE9 and the following steps. If an affirmative determination is obtained in step SE2, the control flow goes to step SE3 to compare the path information stored in the path-information storage section 86 of the detected relay tag 14 and the path information stored in the apparatus 12 for communication with a radio-frequency tag in question, for determining whether the length of the path to the server via the communication device 12 in question is shorter than the length of the path to the server via the detected relay tag 14. If an affirmative determination is obtained in step SE3, the control flow goes to step SE4 write in the path-information storage portion 86 of the detected relay tag 14 the path information indicative of the path to the server via the apparatus 12 for communication with a radio-frequency tag in question. Then, the control flow goes back to the relay tag search control routine of FIG. 13. If a negative determination is obtained in step SE3, the control flow goes to step SE5 to determine whether the identification code of the adjacent apparatus 12 for communication with a radio-frequency tag stored in the leading portion of the path information stored in the apparatus 12 for communication with a radio-frequency tag has been updated or not. This determination is made on the basis of the updated time stored with the path information. If a negative determination is obtained in step SE5, the control flow goes to step SE4. If an affirmative determination is obtained in step SE5, the control flow goes to step SE6 to determine whether the relay tag identified by the identification code stored in the leading portion of the path information stored in the apparatus 12 for communication with a radio-frequency tag in question is located adjacent to the communication device 12 in question. If a negative determination is obtained in step SE6, the control flow goes to step SE3 to update the path information stored in the apparatus 12 for communication with a radio-frequency tag in question, on the basis of the path information stored in the path-information storage portion 86 of the detected relay tag 14, and goes back to the relay tag search control routine of FIG. 13. If an affirmative determination is obtained in step SE6, the control flow goes to step SE7 to determine whether the length of the path to the server via the detected relay tag 14 is shorter than the length of the path represented by the path information stored in the apparatus 12 for communication with a radio-frequency tag in question. If a negative determination is obtained in step SE7, the control flow goes back to the relay tag search control routine of FIG. 13. If an affirmative determination is obtained in step SE7, the control flow goes to step SE8, and goes back to the relay tag search control routine of FIG. 13. If an affirmative determination is obtained in step SE9, that is, if it is determined that the path-information storage portion 86 in the detected relay tag 14 is empty, this means a failure to generate the path information. In this case, the control flow goes back to the relay tag search control routine of FIG. 13. If a negative determination is obtained in step SE9, that is, if the path-information storage portion 86 is not empty, the control flow goes to step SE10 update the path information stored in the apparatus 12 for communication with a radio-frequency tag in question, on the basis of the path information stored in the path-information storage portion 86 of the detected relay tag 14, and goes back to the relay tag search control routine of FIG. 13.

Figure 15:
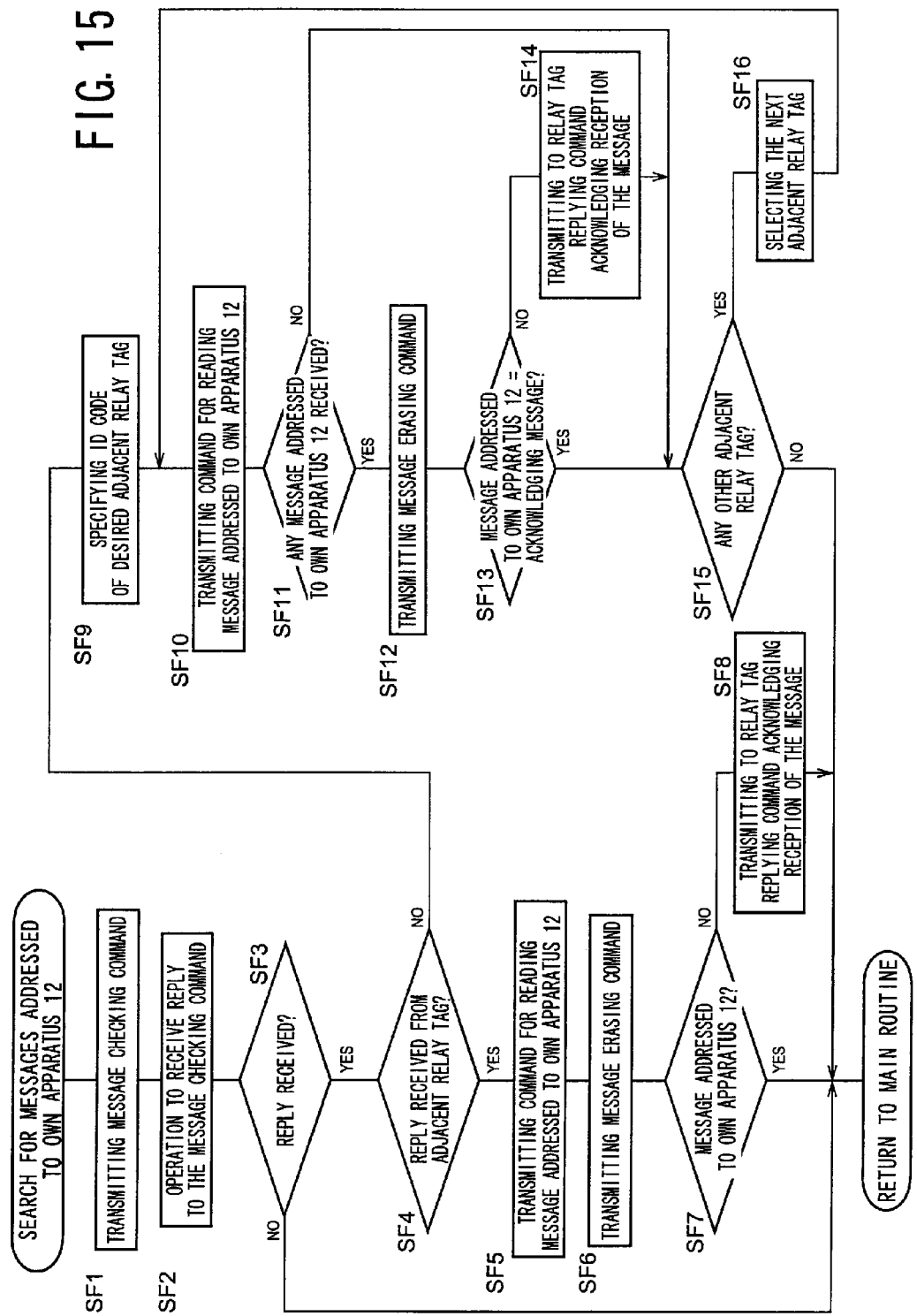
FIG. 15 is a flow chart illustrating a control routine for searching any message addressed to the own apparatus for communication with a radio-frequency tag, which is executed in a step of the RFID communication control routine of FIG. 12.

The control routine of FIG. 15 for searching for messages addressed to the apparatus 12 for communication with a radio-frequency tag in question is initiated with step SF1 to generate and transmit the message checking command. Then, the control flow goes to step SF2 to perform an operation to receive a reply from any radio-frequency tag 14 in response to the message checking command transmitted in step SF1. The control flow then goes to step SF3 to determine whether a reply from any relay tag 14 in response to the message checking command has been received. If a negative determination is obtained in step SF3, the control flow goes back to the main routine of FIG. 12. If an affirmative determination is obtained in sep SF4, the control flow goes to step SF4 to determine whether the identification code included in the reply received from the relay tag is identical with the identification code of the adjacent relay tag 14. If a negative determination is obtained in step SF4, this indicates a failure to read the identification code of any radio-frequency tag 14 due to reception of replies from the two or more radio-frequency tags 14. In this case, the control flow goes to step SF9 and the following steps. If an affirmative determination is obtained in step SF4, this indicates reception of the reply from one adjacent relay tag 14, and the control flow goes to step SF5 to transmit the message reading command for reading any message addressed to the apparatus 12 for communication with a radio-frequency tag in question, and to receive the message from the adjacent relay tag 14. Step SF6 is then implemented to transmit to the adjacent relay tag 14 the message erasing command for erasing the message which has been received in step SF5. Then, the control flow goes to step SF7 to determine whether the message received by the apparatus 12 for communication with a radio-frequency tag in question is the replying message acknowledging normal reception of a message by another apparatus 12 for communication with a radio-frequency tag via the adjacent relay tag 14. If an affirmative determination is obtained in step SF7, the control flow goes back to the main routine of FIG. 12. If a negative determination is obtained in step SF7, the control flow goes to step SF8 to transmit to the relay tag 14 in question the replying command acknowledging normal reception of the message by the apparatus 12 for communication with a radio-frequency tag in question from another apparatus 12 for communication with a radio-frequency tag via the relay tag 14. Then, the control flow goes back to the main routine of FIG. 12. If a negative determination is obtained in step SF4, that is, if it is determined that the identification code included in the reply from the relay tag 14 is not identical with the identification code of an adjacent relay tag 14, the control flow goes to step SF9 to specify the identification code of a desired one of the adjacent relay tags 14. Then, the control flow goes to step SF10 transmit to the specified relay tag 14 the message reading command for reading any message addressed to the apparatus 12 for communication with a radio-frequency tag in question. Step SF 11 is then implemented to determine whether any message addressed to the apparatus 12 for communication with a radio-frequency tag has been received. If a negative determination is obtained in step SF11, the control flow goes to step SF15 and the following steps. If an affirmative determination is obtained in step SF11, the control flow goes to step SF12 to transmit to the specified relay tag 14 the message erasing command for erasing the message which has been received in step SF10. Then, the control flow goes to step SF13 to determine whether the message received by the apparatus 12 for communication with a radio-frequency tag in question in sep SF10 is the replying message acknowledging normal reception of a message by another apparatus 12 for communication with a radio-frequency tag via the relay tag 14. If a negative determination is obtained in step SF13, the control flow goes to step SF14 to transmit to the relay tag 14 the replying command acknowledging normal reception of the message by the apparatus 12 for communication with a radio-frequency tag in question from another apparatus 12 for communication with a radio-frequency tag via the relay tag 14, and then goes to sep SF15. If an affirmative determination is obtained in sep SF13, the control flow goes to step SF15 to determine whether there is any other adjacent reply tag 14. If an affirmative determination is obtained in step SF15, the control flow goes to step SF16 to select the next adjacent relay tag 14, and goes back to step SF10 and the following steps. If a negative determination is obtained in step SF15, the control flow goes back to the main routine of FIG. 12.

In the present second embodiment described above, each radio-frequency tag 14 functioning as a relay tag includes the adjacent-station identification code storage portion 84 for storing the identification codes of adjacent apparatus 12 for communication with a radio-frequency tag which are located adjacent to that relay tag. Accordingly, the path information indicative of the path to the apparatus 12a for communication with a radio-frequency tag functioning as the server can be suitably updated, so that radio communication among the apparatus 12 for communication with a radio-frequency tag can be effected with higher reliability.

The second embodiment is further arranged such that each radio-frequency tag 14 functioning as a relay tag includes the path-information storage portion 86 for storing the path information indicative of the path to the apparatus 12a for communication with a radio-frequency tag functioning as the server. The path information stored in the path-information storage portion 86 can be updated so that the path information indicates the shortest path to the server.

The second embodiment is further arranged such that each apparatus 12 for communication with a radio-frequency tag also stores the path information, and updates the path information stored in each relay tag 14 so that the updated path information indicates the shortest path to the desired apparatus 12 for communication with a radio-frequency tag.

Embodiment 3

Figure 16:
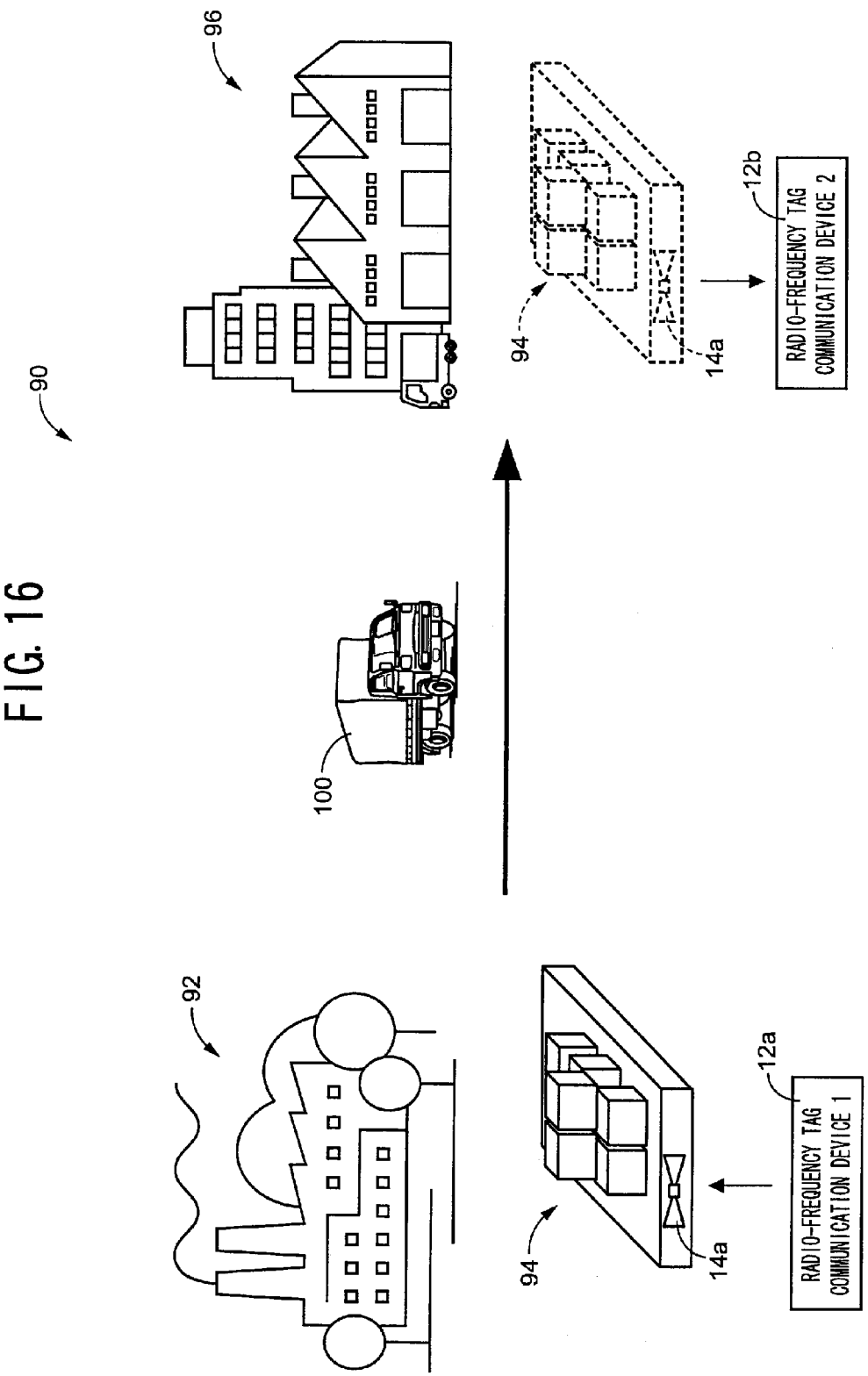
FIG. 16 is a view showing a radio-frequency communication system constructed according to a third embodiment of this invention.

FIG. 16 shows a radio-frequency communication system 90 constructed according to a third embodiment of the present invention. The present radio-frequency communication system 90 includes: a radio-frequency tag 14a functioning as a relay tag (managing tag) storing management information on a plurality of radio-frequency tags 14 affixed to respective articles of a group of commodity 94; an apparatus for communication with a radio-frequency tag 12a provided in a first plant 92 of the group of commodity 94; and an apparatus for communication with a radio-frequency tag 12b provided in a second plant 96 of the group of commodity 94. The management information stored in the relay tag 14a include number information indicative of the number of the radio-frequency tags 14 to be managed by the relay tag 14a, that is, the number of the articles to which the radio-frequency tags 14 are affixed.

In the radio-frequency communication system 90 arranged as described above, the management information including the number of the plurality of radio-frequency tags 14 affixed to the articles of the group of commodity 94 in an upstream part in the form of the first plant 92 of a physical distribution management system (commodity transportation system) is written on the radio-frequency tag 14a functioning as the relay tag (management tag), by the apparatus 12a for communication with a radio-frequency tag provided in the first plant 92. After the commodity group 94 has been transported by a transportation vehicle 100 from the first plant 92 to a downstream part in the form of the second plant 96 of the physical distribution management system, the apparatus 12 for communication with a radio-frequency tag provided in the second plant 96 reads out the management information from the radio-frequency tag 14a, performs an operation to search for the plurality of radio-frequency tags 14 affixed to the group of commodity 94, and inspects the articles of the group of commodity 94 by reference to the read-out management information. Thus, the group of commodity 94 can be inspected without radio communication with a server.

In the present third embodiment described above, the relay tag 14a stores the management information on the non-relay tags 14, and the radio-frequency tag 12b is arranged to read out the management information on the non-relay tags 14, so that the group of commodity 94 can be inspected without radio communication with all of the non-relay tags 14.

The third embodiment is further arranged such that the management information stored in the relay tag 14a includes number information indicative of the number of the radio-frequency tags 14. In this mode of the invention, the number of the articles of commodity to which the radio-frequency tags 14 are affixed can be recognized, without radio communication with all of the non-relay tag 14.

While the preferred embodiments of the present invention have been described above for illustrative purpose only by reference to the drawings, it is to be understood that the invention may be otherwise embodied.

Figure 17:
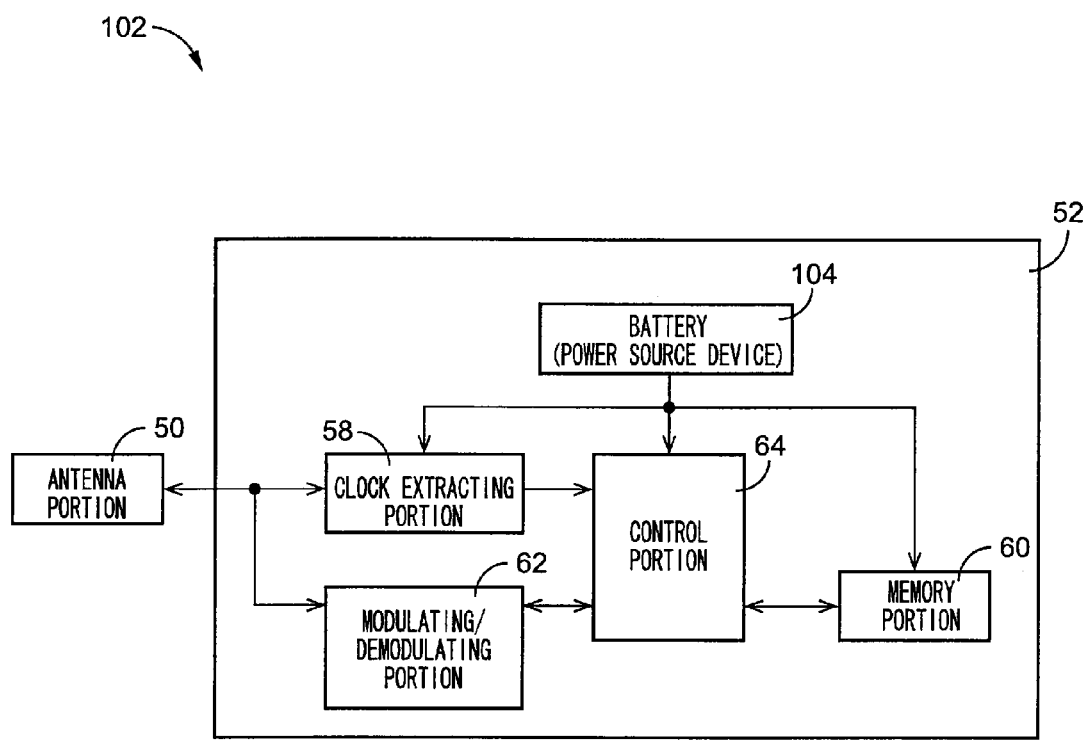
FIG. 17 is a view showing an arrangement of an active tag constructed according to a fourth embodiment of the present invention.

In the illustrated embodiments described above, the radio-frequency tags 14 functioning as the relay tags are so-called "passive tags" configured to transmit the reply wave Fr, by utilizing an energy of the interrogating wave Fc received from each apparatus 12 for communication with a radio-frequency tag. However, the radio-frequency tags 14 may be replaced by so-called "active tags" 102, each of which includes a battery 104 in place of the rectifying portion 54 and power source portion 56, as shown in FIG. 17, so that the electric energy in the battery 104 is used for operation of the active tags 102. In this modified embodiment, the reply wave Fr can be transmitted to the apparatus 12 for communication with a radio-frequency tag which are comparatively distant from the active tags 102. Namely, the active tags 102 have an increased maximum distance of communication with the apparatus 12 for communication with a radio-frequency tag.

In the illustrated embodiments, the transmitted-signal generating portion 46 is a functional portion of the DSP 16 of each apparatus 12 for communication with a radio-frequency tag. However, the transmitted-signal generating portion 46 may be a control device separate from the DSP 16. Further, the operation of the transmitted-signal generating portion 46 may be controlled by either digital or analog signal processing.

It is to be understood that the present invention may be embodied with various other changes which may occur to those skilled in the art, without departing from the spirit and scope of this invention.

What is claimed is:

1. An apparatus for communication with a radio-frequency tag configured to transmit a transmitted signal and to receive a reply signal transmitted from said radio-frequency tag in response to said transmitted signal, for effecting radio communication with said radio-frequency tag, said apparatus for communication with a radio-frequency tag comprising:
a transmitter portion configured to transmit to said radio-frequency tag a message writing command for writing on the radio-frequency tag a desired message to be transmitted to another apparatus for communication with a radio-frequency tag via said radio-frequency tag.

2. The apparatus for communication with a radio-frequency tag according to claim 1, wherein said desired message includes an identification code of said another apparatus for communication with a radio-frequency tag which is a receiver of said desired message.

3. The apparatus for communication with a radio-frequency tag according to claim 1, wherein said desired message includes an identification code of the apparatus for communication with a radio-frequency tag which is a transmitter of said desired message.

4. The apparatus for communication with a radio-frequency tag according to claim 1, wherein said transmitter portion is configured to transmit to said radio-frequency tag a first message erasing command asking the radio-frequency tag to erase a message which has been transmitted from another apparatus for communication with a radio-frequency tag via said radio-frequency tag to the apparatus for communication with a radiofrequency tag which is a receiver of the message an identification code of which is written on said radio-frequency tag.

5. The apparatus for communication with a radio-frequency tag according to claim 3, wherein said transmitter portion is configured to transmit to said radio-frequency tag a second message erasing command asking the radio-frequency tag to erase said desired message which has been transmitted to said radio-frequency tag from the apparatus for communication with a radio-frequency tag which is the transmitter the identification code of which is written on said radio-frequency tag.

6. The apparatus for communication with a radio-frequency tag according to claim 1, wherein said transmitter portion is configured to transmit to said radio-frequency tag a replying command for writing on the radio-frequency tag a reply message acknowledging normal reception of a message by the apparatus for communication with a radio-frequency tag from said another apparatus for communication with a radio-frequency tag via said radio-frequency tag.

7. The apparatus for communication with a radio-frequency tag according to claim 1, wherein said transmitter portion is configured to transmit to said radio-frequency tag a message reading command for reading a message which has been transmitted to said radio-frequency tag from said another apparatus for communication with a radio-frequency tag, and a message writing command for writing said desired message on said radio-frequency tag.

8. The apparatus for communication with a radio-frequency tag according to claim 1, wherein, said transmitter portion is configured to transmit to surrounding radio-frequency tags a message checking command asking the radio-frequency tag to reply to said message checking command if any of said surrounding radio-frequency tags stores a message including an identification code of the apparatus for communication with a radio-frequency tag, as an address of a receiver of the message stored therein.

9. The apparatus for communication with a radio-frequency tag according to claim 8, wherein said transmitter portion repeatedly transmits said message checking command to said surrounding radio-frequency tags at a predetermined time interval.

10. The apparatus for communication with a radio-frequency tag according to claim 1, further comprising a path-information storage portion for storing path information indicative of a path to said another apparatus for communication with a radio-frequency tag.

11. A radio-frequency tag with which an apparatus for communication according to claim 1 effects radio communication, said radio-frequency tag comprising a plurality of message storage portions each of which is provided to store said desired message.

12. The radio-frequency tag according to claim 11, wherein each of said plurality of message storage portions includes a transmitter identification code storage section for storing an identification code of the apparatus for communication with a radio-frequency tag which is a transmitter of said desired message.

13. The radio-frequency tag according to claim 11, wherein each of said plurality of message storage portions includes a receiver identification code storage section for storing an identification code of the apparatus for communication with a radio-frequency tag which is a receiver of said desired message.

14. The radio-frequency tag according to claim 13, which is configured to be operable, in response to a first message erasing command received from the apparatus for communication with a radio-frequency tag, to erase the message stored in said message storage portion the receiver identification code storage section of which stores the identification code of said receiver of the message, which identification code is identical with an identification code of said apparatus for communication with a radio-frequency tag from which said first message erasing command has been received.

15. The radio-frequency tag according to claim 12, which is configured to be operable, in response to a second message erasing command received from the apparatus for communication with a radio-frequency tag, to erase the message stored in said message storage portion the transmitter identification code storage section of which stores the identification code of said transmitter of the message, which identification code is identical with an identification code of said apparatus for communication with a radio-frequency tag from which said second message erasing command has been received.

16. The radio-frequency tag according to claim 11, further comprising a relay-station identification code storage portion for storing an identification code of the radio-frequency tag functioning as a relay station for transmission of the message among a plurality of apparatus for communication with a radio-frequency tag.

17. The radio-frequency tag according to claim 13, which is configured such that when the radio-frequency tag has received a message checking command from the apparatus for communication with a radio-frequency tag, and if an identification code of the apparatus for communication with a radio-frequency tag from which said message checking command has been received is identical with the identification code stored in said receiver identification code storage section, the radio-frequency tag transmits to said apparatus for communication with a radio-frequency tag said message including the identification code of said receiver.

18. The radio-frequency tag according to claim 13, which is configured such that when the radio-frequency tag has received a message checking command from the apparatus for communication with a radio-frequency tag, and if an identification code of the apparatus for communication with a radio-frequency tag from which said message checking command has been received is identical with the identification code stored in said receiver identification code storage section, the radio-frequency tag transmits the identification code of said receiver to the above-indicated apparatus for communication with a radio-frequency tag.

19. The radio-frequency tag according to claim 11, further comprising an adjacent-station identification code storage portion for storing identification codes of a plurality of adjacent apparatus for communication with a radio-frequency tag which are adjacent to the radio-frequency tag.

20. The radio-frequency tag according to claim 11, further comprising a path-information storage portion for storing path information indicative of a path to a desired apparatus for communication with a radio-frequency tag.

21. The radio-frequency tag according to claim 11, wherein said message storage portion is constituted by a non-volatile memory formed of a ferroelectric material.

22. The radio-frequency tag according to claim 11, which is an active tag comprising a power source device which supplies an electric energy for operation of the active tag.

23. A radio-frequency communication system, comprising:
   at least one radio-frequency tag according to claim 11; and
   a plurality of apparatus for communication with said at least one radio frequency tag,
   wherein a message is transmitted from one of said plurality of apparatus for communication with said at least one radio-frequency tag to another of said plurality of apparatus for communication with said at least one radio-frequency tag via one of said at least one radio-frequency tag, which functions as a relay tag.

24. The radio-frequency communication system according to claim 23, which includes a plurality of radio-frequency tags, and wherein said relay tag stores management information on the other of said plurality of radio-frequency tags, and one of said plurality of apparatus for communication with a radio-frequency tag reads out said management information from said relay tag.

25. The radio-frequency communication system according to claim 24, wherein said management information includes number information indicative of the number of said other of the plurality of radio-frequency tags.

26. A method of effecting radio communication by a radio-frequency communication system, according to claim 23, said method comprising:

transmitting a message from one of said plurality of apparatus for communication with a radio-frequency tag to another of said plurality of apparatus for communication with a radio-frequency tag via one of said at least one radio-frequency tag, which functions as a relay tag.

27. The method according to claim 26, wherein said radio-frequency communication system includes a plurality of radio-frequency tags, and wherein said relay tag stores management information on the other of said plurality of radio-frequency tags, and one of said plurality of apparatus for communication with a radio-frequency tag reads out said management information from said relay tag.

28. The method according to claim 27, wherein said management information includes number information indicative of the number of said other of the plurality of radiofrequency tags.

* * * * *